(12) United States Patent
Togo et al.

(10) Patent No.: US 10,347,931 B2
(45) Date of Patent: Jul. 9, 2019

(54) MICROBIAL FUEL CELL

(71) Applicant: Sharp Kabushiki Kaisha, Sakai-shi, Osaka (JP)

(72) Inventors: Makoto Togo, Sakai (JP); Hidekazu Shima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 282 days.

(21) Appl. No.: 15/122,425

(22) PCT Filed: Jul. 7, 2015

(86) PCT No.: PCT/JP2015/069486
§ 371 (c)(1),
(2) Date: Aug. 30, 2016

(87) PCT Pub. No.: WO2016/035440
PCT Pub. Date: Mar. 10, 2016

(65) Prior Publication Data
US 2017/0077541 A1    Mar. 16, 2017

(30) Foreign Application Priority Data

Sep. 3, 2014   (JP) ................. 2014-179012
Sep. 3, 2014   (JP) ................. 2014-179189
Sep. 4, 2014   (JP) ................. 2014-180301

(51) Int. Cl.
*H01M 8/16*       (2006.01)
*H01M 8/0221*     (2016.01)
*H01M 8/04082*    (2016.01)

(52) U.S. Cl.
CPC ........... *H01M 8/16* (2013.01); *H01M 8/0221* (2013.01); *H01M 8/04201* (2013.01); *Y02E 60/527* (2013.01)

(58) Field of Classification Search
None
See application file for complete search history.

(56) References Cited

U.S. PATENT DOCUMENTS 3,941,135 A * 3/1976 von Sturm ............. A61N 1/378
                                                    607/35
2014/0315046 A1 10/2014 Yoshida et al.

FOREIGN PATENT DOCUMENTS

JP    2007-324005 A    12/2007
JP    2011-065875 A     3/2011
(Continued)

OTHER PUBLICATIONS

Official Communication issued in International Patent Application No. PCT/JP2015/069486, dated Oct. 6, 2015.
(Continued)

Primary Examiner — Wojciech Haske
(74) Attorney, Agent, or Firm — Keating & Bennett, LLP

(57) ABSTRACT

By a microbial fuel cell including: an anode electrode that includes, as a catalyst, current-generating bacteria supplied from soil or mud, and oxidizes an organic fuel supplied from soil or mud; and a cathode electrode that reduces oxygen supplied from air or water, the microbial fuel cell having an oxygen permeation restricting layer between the anode electrode and the cathode electrode facing each other, it is possible to provide, at low cost, a microbial fuel cell having high power generation performance due to direct power generation from soil or mud and capable of being thinned and miniaturized.

3 Claims, 29 Drawing Sheets

(56) References Cited

FOREIGN PATENT DOCUMENTS

| | | |
|---|---|---|
| JP | 2013-084541 A | 5/2013 |
| JP | 2013-239292 A | 11/2013 |
| JP | 2015-204198 A | 11/2015 |
| WO | 2013/073284 A1 | 5/2013 |

OTHER PUBLICATIONS

Keego Technologies, LLC, "Dirt=Power: An Intro to Microbial Fuel Cells", http://www.mudwatt.com/pages/educational-resources, Last Modified May 2011, 25 pages.

* cited by examiner

FIG.22
(a)
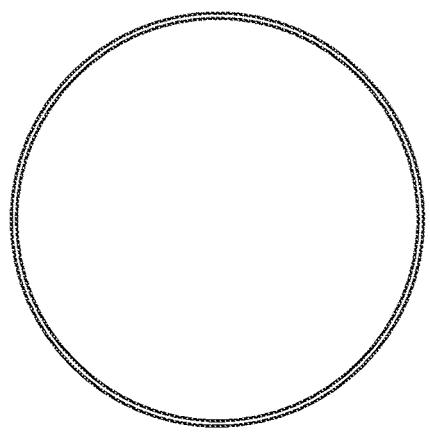
(b)
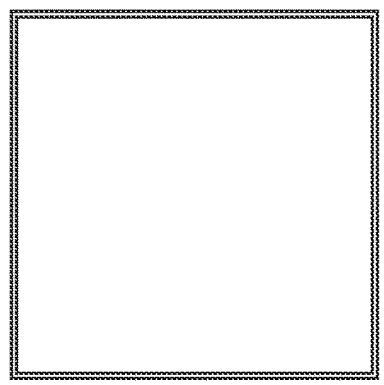
(c)
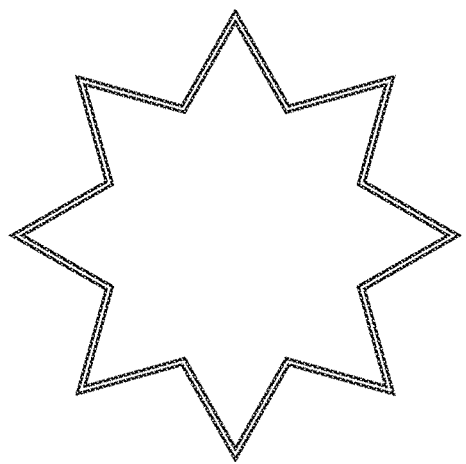

FIG.31 (a)
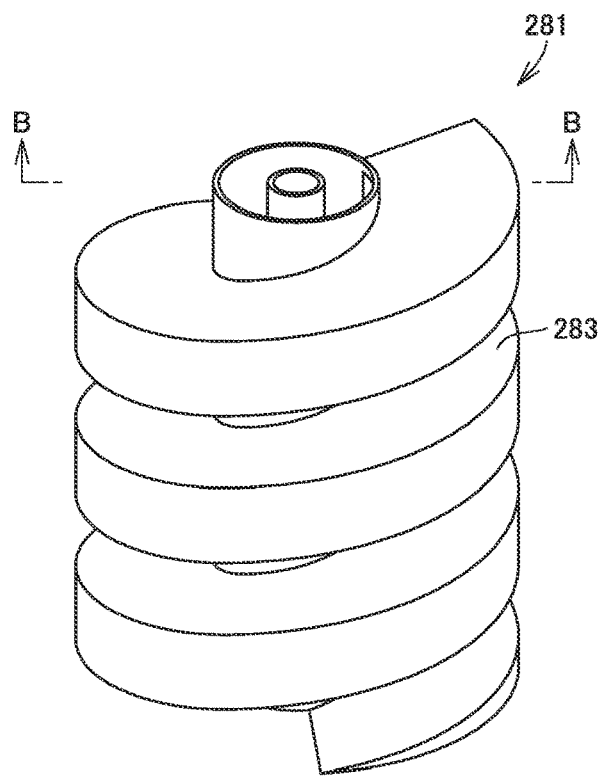
(b)
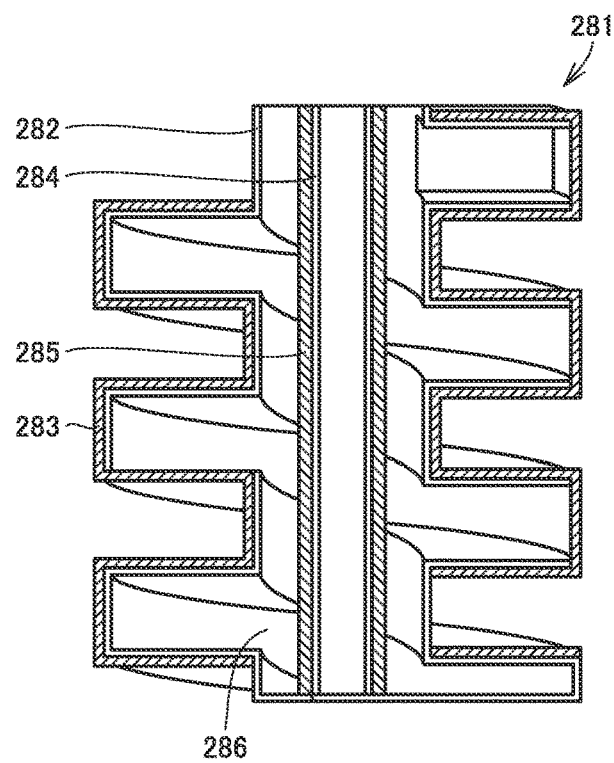

MICROBIAL FUEL CELL

TECHNICAL FIELD

The present invention relates to a cell structure of a microbial fuel cell.

BACKGROUND ART

A fuel cell, which generates water ($H_2O$) by binding of hydrogen ($H_2$) with oxygen ($O_2$), and draws out electrons ($e^-$), recently receives attention as clean energy because only water is generated by the reaction. However, a hydrogen fuel cell which is a fuel cell using hydrogen is costly because a noble metal such as platinum is used as an electrode catalyst. It is also necessary to separately purify and modify fuel hydrogen because it is not available in the surroundings.

Under these circumstances, as a fuel cell capable of generating electricity from organic matters such as hydrocarbons or amino acids in the surroundings by using microorganisms as an electrode catalyst, a microbial (bio) fuel cell receives attention as low-cost clean energy. A microbial fuel cell is generally so configured that oxygen is reduced at the cathode electrode, and an organic fuel such as hydrocarbons or amino acids is oxidized at the anode electrode. In the microbial fuel cell, the reduction of oxygen at the cathode electrode can be carried out by using an electrode material having oxygen reducing ability such as carbon besides a noble metal catalyst such as platinum. In addition, in the microbial fuel cell, oxidation of a fuel at the anode electrode is carried out by the electrode that receives electrons that are transmitted in the process in which the microorganism carried on the anode electrode metabolizes (oxidizes) the fuel.

For example, Japanese Patent Laying-Open No. 2007-324005 (PTD 1) discloses a microbial fuel cell having such a structure that an anode tank (culture tank) and a cathode tank (redox reaction tank) are separated by an insulating ion exchange membrane, the anode tank is hermetically filled with a solvent that is a mixture of a microorganism which serves as a catalyst of the anode, and an organic molecule which serves as a fuel therefor, and the cathode tank is hermetically filled with a solvent that is a mixture of molecules mediating electrons between oxygen and an electrode, and is different from that in the anode tank.

In order to configure the microbial fuel cell more simply at low cost, it is possible to configure a microbial fuel cell by embedding an electrode which serves as an anode in soil, and disposing a cathode electrode on the surface of the soil (See the publicly known information listed in "Educational Resources" in the item of "Community" on the homepage of Keego Tech (http://www.mudwatt.com/pages/educational-resources) [searched on Jun. 17, 2015] (NPD 1). For example, "Dirt=Power: An Intro to Microbial Fuel Cells" recited as "Beginner Intro to Microbial Fuel Cells."). The cell structure like this eliminates the need of extraction of microorganisms, adjustment of an anode solution and a cathode solution, and an expensive ion exchange membrane having high molecular permeation selectivity, and thus it is possible to realize a microbial fuel cell conveniently at low cost.

However, microorganisms that are used in the anode of the microbial fuel cell as described above are often anaerobic. The term "anaerobic" used herein encompasses both "obligatory anaerobic" and "facultative anaerobic." When power generation is conducted by disposing an electrode in soil or mud, an obligatory anaerobic microorganism cannot live in the surface part of the soil and mud where oxygen is abundant, and a facultative anaerobic microorganism cannot metabolize (oxidize) a fuel in the surface part of the soil and mud where oxygen is abundant, so that the anode is inevitably disposed in a deep position far from the surface. In addition, since oxygen exists near the anode, the performance of the cell is also deteriorated by a redox reaction at the anode. Accordingly, the distance between the anode and the cathode is inevitably increased, and this makes it difficult to thin and miniaturize the cell.

CITATION LIST

Patent Document

PTD 1: Japanese Patent Laying-Open No. 2007-324005
PTD 2: Japanese Patent Laying-Open No. 2013-84541
PTD 3: Japanese Patent Laying-Open No. 2011-65875

Non Patent Document

NPD 1: Homepage of Keego Tech (http://www.mudwatt.com/pages/educational-resources)

SUMMARY OF INVENTION

Technical Problem

In light of the present circumstances as described above, it is an object of the present invention to provide, at low cost, a microbial fuel cell having high power generation performance due to direct power generation from soil and mud, and capable of being thinned and miniaturized.

Solution to Problem

In order to solve the aforementioned problems, the present inventors focused on disposing an "oxygen permeation restricting layer" between the anode electrode and the cathode electrode. That is, the present invention is as follows.

The microbial fuel cell of the present invention is a microbial fuel cell including: an anode electrode that includes, as a catalyst, current-generating bacteria supplied from soil or mud, and oxidizes an organic fuel supplied from soil or mud; and a cathode electrode that reduces oxygen supplied from air or water, the microbial fuel cell having an oxygen permeation restricting layer between the anode electrode and the cathode electrode facing each other.

In the microbial fuel cell of the present invention, it is preferred that the oxygen permeation restricting layer is a layer formed of a hydrogel, and it is more preferred that the hydrogel is formed of a polymer sugar chain.

In the microbial fuel cell of the present invention, it is preferred that a moisturizing layer is provided on the cathode electrode.

Preferably, the microbial fuel cell of the present invention further includes, on an anode electrode side of the oxygen permeation restricting layer, a casing having at least one hole through which at least either of a microorganism and a nutrient therefor is replaceable.

Advantageous Effects of Invention

According to the present invention, it is possible to provide, at low cost, a thin microbial fuel cell capable of retaining high power generation performance due to direct power generation from soil or mud.

BRIEF DESCRIPTION OF DRAWINGS

FIGS. 22(a) to 22(c) schematically show various sectional shapes for the longitudinal direction of a first cylindrical retainer in the microbial fuel cell of the third aspect of the invention.

FIGS. 31(a) and 31(b) schematically show a microbial fuel cell 281 of Embodiment 7 of the third aspect of the invention.

DESCRIPTION OF EMBODIMENTS

Hereinafter, a microbial fuel cell including: an anode electrode that includes, as a catalyst, current-generating bacteria supplied from soil or mud, and oxidizes an organic fuel supplied from soil or mud; and a cathode electrode that reduces oxygen supplied from air or water, the microbial fuel cell having an oxygen permeation restricting layer between the anode electrode and the cathode electrode facing each other (hereinafter, also referred to as a "first aspect of the invention") will be described.

<Embodiment 1 of the First Aspect of the Invention>

Figure 1:
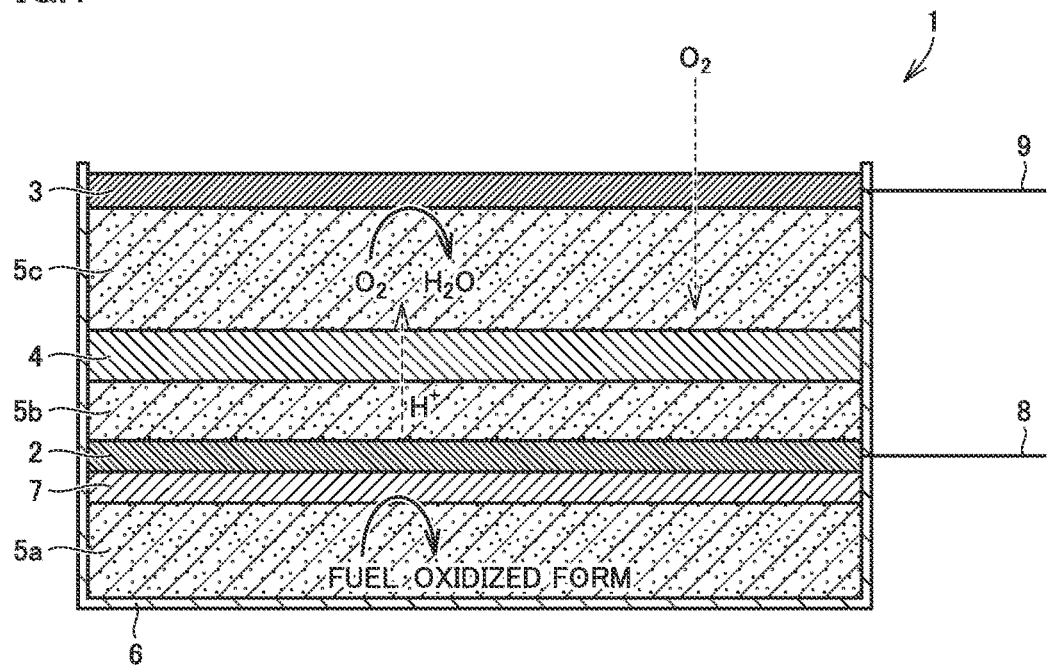
FIG. 1 schematically shows a microbial fuel cell 1 of Embodiment 1 of a first aspect of the invention.

FIG. 1 schematically shows a microbial fuel cell 1 of Embodiment 1 of the first aspect of the invention. Microbial fuel cell 1 of the example shown in FIG. 1 has an anode electrode 2, a cathode electrode 3, an oxygen permeation restricting layer 4, soil or mud 5 (5a, 5b, 5c), and a casing 6. In the example shown in FIG. 1, casing 6 has an opening on one side, and is disposed so that the opening is upside, and casing 6 accommodates soil or mud 5 (5a, 5b, 5c). In the example shown in FIG. 1, anode electrode 2 is disposed on the bottom side (lower side) of casing 6, and cathode electrode 3 is disposed on the opening side (upper side) of casing 6.

In microbial fuel cell 1 of the first aspect of the invention, the arrangement of anode electrode 2, cathode electrode 3, and oxygen permeation restricting layer 4 is not particularly limited as long as oxygen permeation restricting layer 4 is interposed between anode electrode 2 and cathode electrode 3. However, it is preferred that cathode electrode 3, oxygen permeation restricting layer 4, and anode electrode 2 are arranged from upside to downside when the opening side of the casing having an opening on one side is defined as upside as shown in FIG. 1. Although anode electrode 2, oxygen permeation restricting layer 4, and cathode electrode 3 may be arranged in this order from upside to downside, since cathode electrode 3, oxygen permeation restricting layer 4, anode electrode 2, soil or mud 5 (5a, 5b, 5c), and water contained therein are difficult to drop by the gravity, it is preferred to arrange cathode electrode 3, oxygen permeation restricting layer 4, and anode electrode 2 in this order from upside to downside as shown in FIG. 1.

(Anode Electrode)

In microbial fuel cell 1 of the first aspect of the invention, anode electrode 2 includes, as a catalyst, anaerobic current-generating bacteria 7 supplied from soil or mud, and oxidizes an organic fuel supplied from soil or mud. As such anode electrode 2, a material that requires conductivity and has excellent corrosion resistance is used. Preferred examples of such a material include materials such as stainless steel, platinum, gold, and carbon, and a conductive material such as a metal coated with stainless steel, platinum, gold, carbon or the like.

Further, by using anode electrode 2 having a structure or a form capable of gaining an electrode area larger than the project area, such as a fine structure or a mesh form, it is possible to increase the adsorption area of the microorganism, and to obtain high power generation current.

When carbon felt, carbon paper or the like is used as anode electrode 2, the electric resistance is low, the adsorption amount of the microorganism can be increased, and the cost can be reduced compared with the case of using a noble metal material. However, the material is not limited to these.

In addition, by using an electron mediating substance (electron mediator) such as a quinone molecule or iron oxide as anode electrode 2, it is possible to exchange electrons with the microorganism smoothly, and to increase the current. Therefore, there is a case where an electron mediating substance (electron mediator) is disposed in the vicinity of the electrode, or immobilized to the electrode. However, the electron mediating substance is not necessarily required.

In the first aspect of the invention, as the current-generating bacteria used in anode electrode 2, for example, conventionally known appropriate anaerobic current-generating bacteria, such as *Shewanella* bacteria, Geobacter bacteria, *Rhodoferax ferrireducens*, and *Desulfobulbus propionicus* can be recited. Among these, *Shewanella* bacteria are preferred because they are abundantly contained in diverse soil, and can easily give and receive electrons with an anode electrode. In addition, as an organic compound that is oxidized by anode electrode 2, for example, hydrocarbons such as glucose, acetic acid and lactic acid, and amino acids are preferred.

(Cathode Electrode)

In microbial fuel cell 1 of the first aspect of the invention, cathode electrode 3 reduces oxygen supplied from air and water. As such cathode electrode 3, a material that requires conductivity, has excellent corrosion resistance and has electrochemical redox ability is used. Preferred examples of such a material include materials such as stainless steel, platinum, gold, and carbon, and conductive materials such as a metal coated with stainless steel, platinum, gold, carbon or the like. In addition, a conductive material coated with an enzyme or a microorganism having redox ability may be used as an electrode.

Further, by using cathode electrode 3 having a structure or a form capable of gaining an electrode area larger than the project area, such as a fine structure or a mesh form, it is possible to increase the reaction area with oxygen, and to obtain high power generation current.

When carbon felt, carbon paper or the like is used as cathode electrode 3, the electric resistance is low, the electrode area capable of oxygen reduction can be increased, and the cost can be reduced compared with the case of using a noble metal material. However, the material is not limited to these.

In addition, by using an electron mediating substance (electron mediator) such as a ferrocyanide ion as cathode electrode 3, it is possible to exchange electrons between oxygen and the electrode smoothly, and to increase the current. Therefore, an electron mediating substance (electron mediator) may be disposed in the vicinity of an electrode, or immobilized to the electrode. However, the electron mediating substance is not necessarily required.

(Oxygen Permeation Restricting Layer)

Microbial fuel cell 1 of the first aspect of the invention has a principal feature that it has oxygen permeation restricting layer 4 between anode electrode 2 and cathode electrode 3 as described above. Here, "oxygen permeation restricting layer" refers to a layer having a function of restricting diffusion of oxygen of anode electrode 2 from the side of cathode electrode 3 exposed to air, and allowing migration of ions to cathode electrode 3 from anode electrode 2. The "layer" in "oxygen permeation restricting layer" refers to a layer including a plane that is perpendicular to the vertical direction of casing 6 of microbial fuel cell 1, and extending over the entire area of the opening of the casing. Oxygen permeation restricting layer 4 used for such a purpose can be formed of any material capable of inhibiting diffusion and permeation of oxygen toward the anode from the cathode side contacting air. However, in consideration of the low cost, the ability to adapt to the form of soil, mud, and casing 6 and thereby closely block oxygen, and the ease of adjusting the physical properties of the material by adjusting the salt concentration, density and the like, a material in the form of a hydrogel is preferred, and agar-agar is particularly preferred.

A hydrogel formed by incorporating a large quantity of water in a polymer material as a base can physically block oxygen entering and diffusing from the cathode side so that it does not reach the anode by being disposed between cathode electrode 3 and anode electrode 2, and has excellent ion conductivity. This makes it possible to configure a cell without impairing the internal resistance of microbial fuel cell 1. In addition, the ability to adjust the oxygen permeability, the ion conductivity, and the flexibility by adjusting the polymeric structure, the polymer material, the water content, the ion strength and the like of the hydrogel is an advantage in improving the degree of freedom of the design of the microbial fuel cell. In addition, the production cost can be reduced in comparison with the case of forming an oxygen permeation restricting layer by using Nafion (registered trade name) available from Du Pont or the like.

In addition, since the hydrogel has high fluidity, gaps in gravel of soil and gaps between soil and the casing can be filled up, hermetical sealing can be easily achieved without use of a gasket, a good oxygen permeation restricting effect is realized, and the number of parts of the microbial fuel cell can be reduced. This advantageously enables production of the microbial fuel cell at an even lower cost.

While diverse polymer materials can be used for a hydrogel, low-cost, effective production is enabled by using, for example, agar-agar. Although agar-agar may be introduced after being solidified, it is preferably solidified inside the casing to give a more reliable oxygen permeation restricting effect.

Oxygen permeation restricting layer 4 may also be configured by using a material that consumes oxygen, besides the material that physically restrict (or even prevent) permeation of oxygen. For example, by using a material such as an enzyme that reduces oxygen, it is possible to consume oxygen before oxygen reaches anode electrode 2.

In the microbial fuel cell of the first aspect of the invention, FIG. 1 illustrates the case where oxygen permeation restricting layer 4 is formed separately from anode electrode 2 and cathode electrode 3 in a disintegrated manner. However, it goes without saying that oxygen permeation restricting layer 4 may be integrated with anode electrode 2 and cathode electrode 3.

(Microbial Fuel Cell)

In microbial fuel cell 1 of the first aspect of the invention having the configuration as described above, by providing oxygen permeation restricting layer 4 between anode electrode 2 and cathode electrode 3, the conventional problem that the performance of the anode electrode is deteriorated when oxygen that reacts in the cathode electrode reaches the anode electrode will not occur, so that it is possible to provide a microbial fuel cell in which oxygen concentration is reduced in the vicinity of anode electrode 2 and thus having improved performance. In addition, by disposing oxygen permeation restricting layer 4, it is possible to eliminate the necessity of an expensive ion exchange (cation permselective) membrane which is conventionally required. Further, it is possible to reduce the distance between anode electrode 2 and cathode electrode 3, and the current loss due to a large distance between the anode electrode and the cathode electrode will not occur. These lead to the advantage of providing a thinned microbial fuel cell with improved performance.

In the microbial fuel cell of the first aspect of the invention, soil or mud 5 (5a, 5b, 5c) that can be used is not particularly limited, and those containing current-generating bacteria 7 usable as a catalyst in anode electrode 2 and nutrients therefor can be used, and leaf mold is preferably used. In the microbial fuel cell of the first aspect of the invention, casing 6 is also not particularly limited, and is preferably formed of, for example, plastic or the like to have insulating properties.

FIG. 1 illustrates the exemplary configuration in which lead wires 8, 9 are respectively electrically connected to anode electrode 2 and cathode electrode 3, so that electricity generated by microbial power generation can be taken out externally. Lead wires 8, 9 may be electrically connected with, for example, a control circuit (not shown), a load (not shown) or the like.

Hereinafter, an operation of microbial fuel cell 1 shown in FIG. 1 will be described.

When anaerobic current-generating bacteria (for example, the above-described *Shewanella* bacteria) 7 contained in soil or mud are adsorbed to anode electrode 2, and metabolize (oxidize) an organic fuel such as hydrocarbons (for example, glucose and acetic acid) and amino acids contained in soil or mud, electrons ($e^-$) are released to the anode electrode from the electron transfer system (an organic fuel turns into an oxidant after oxidation). The electrons ($e^-$) reach cathode electrode 3 through an external circuit to generate power.

Protons ($H^+$) generated simultaneously with electrons ($e^-$) pass through soil or mud 5 and oxygen permeation restricting layer 4 and reach cathode electrode 3. Electrons ($e^-$), protons ($H^+$), and oxygen ($O_2$) in air and water react on cathode electrode 3 to generate water.

Oxygen that is not consumed in the cathode electrode passes through soil or mud 5 or diffuses in water of soil or mud 5 to migrate toward anode electrode 2. Oxygen permeation restricting layer 4 prevents the oxygen from diffusing and permeating to reach anode electrode 2. Therefore, it is possible to keep the oxygen concentration low in the vicinity of anode electrode 2 as described above, to promote growth of anaerobic current-generating bacteria 7 used as an electrode catalyst, and to prevent an electrode reaction of oxygen on anode electrode 2. Therefore, it is possible to increase the cell performance, and to narrow the distance between anode electrode 2 and cathode electrode 3, and thus it is possible to thin microbial fuel cell 1.

<Embodiment 2 of the First Aspect of the Invention>

Figure 2:
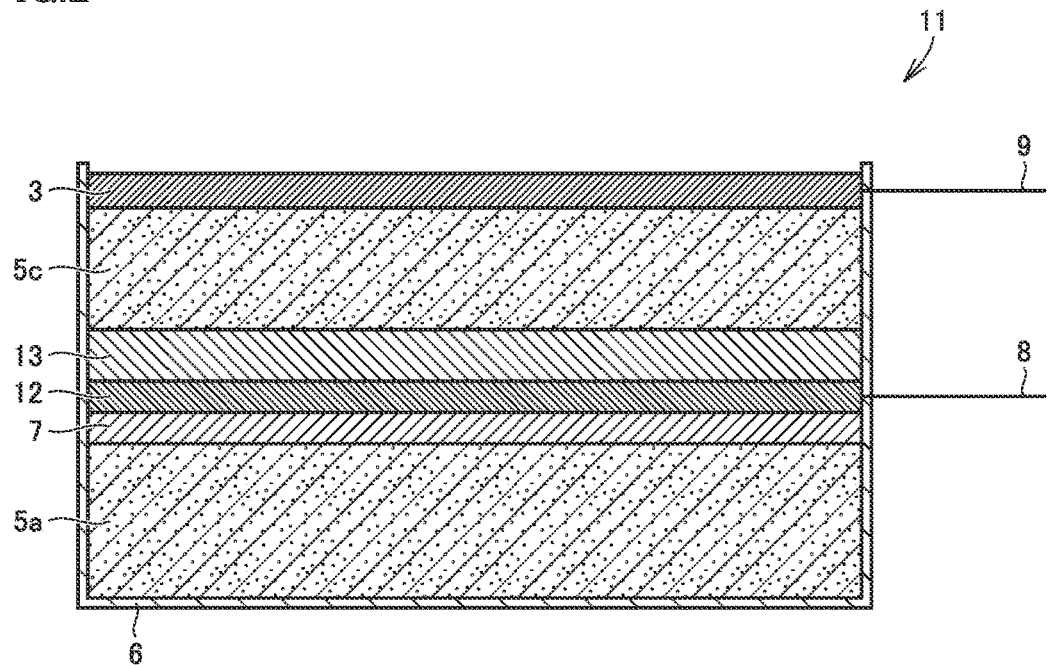
FIG. 2 schematically shows a microbial fuel cell 11 of Embodiment 2 of the first aspect of the invention.

FIG. 2 schematically shows a microbial fuel cell 11 of Embodiment 2 of the first aspect of the invention. In FIG. 2, the part having the same configuration as in the example shown in FIG. 1 is denoted by the same reference numeral, and the description thereof will be omitted. Microbial fuel cell 11 in the example shown in FIG. 2 is configured in the same manner as in microbial fuel cell 1 of the example shown in FIG. 1 except that an anode electrode 12 and an oxygen permeation restricting layer 13 are adjacently arranged in an integrated manner With such a configuration, it is possible to obtain the oxygen permeation restricting effect to anode electrode 12 in the same manner as in microbial fuel cell 1 of the example shown in FIG. 1, and it becomes possible to replace anode electrode 12 and oxygen permeation restricting layer 13 at the same time. In addition, advantageously, it is possible to shorten the electrode-electrode distance between anode electrode 12 and cathode electrode 3.

<Embodiment 3 of the First Aspect of the Invention>

Figure 3:
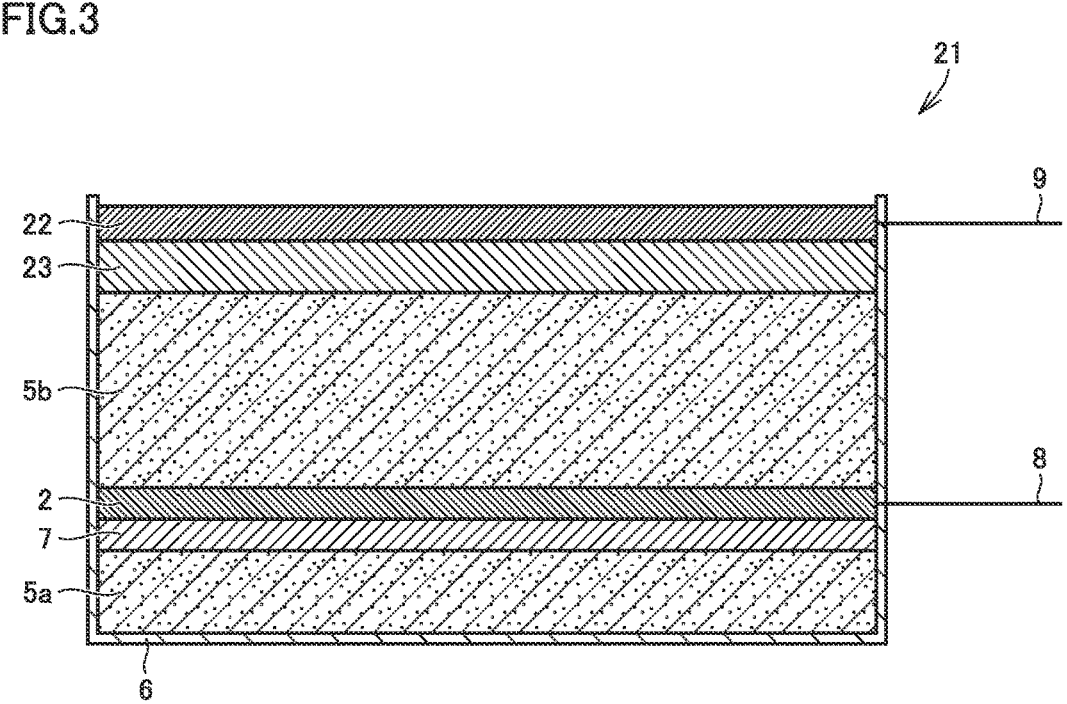
FIG. 3 schematically shows a microbial fuel cell 21 of Embodiment 3 of the first aspect of the invention.

FIG. 3 schematically shows a microbial fuel cell 21 of Embodiment 3 of the first aspect of the invention. In FIG. 3, the part having the same configuration as in the example shown in FIG. 1 or 2 is denoted by the same reference numeral, and the description thereof will be omitted. Microbial fuel cell 21 in the example shown in FIG. 3 is configured in the same manner as in microbial fuel cell 1 of the example shown in FIG. 1 except that a cathode electrode 22 and an oxygen permeation restricting layer 23 are adjacently arranged in an integrated manner With such a configuration, it is possible to obtain the oxygen permeation restricting effect to cathode electrode 22 in the same manner as in microbial fuel cell 1 of the example shown in FIG. 1, and it becomes possible to replace cathode electrode 22 and oxygen permeation restricting layer 23 at the same time. In addition, advantageously, it is possible to shorten the electrode-electrode distance between anode electrode 2 and cathode electrode 22.

<Embodiment 4 of the First Aspect of the Invention>

Figure 4:
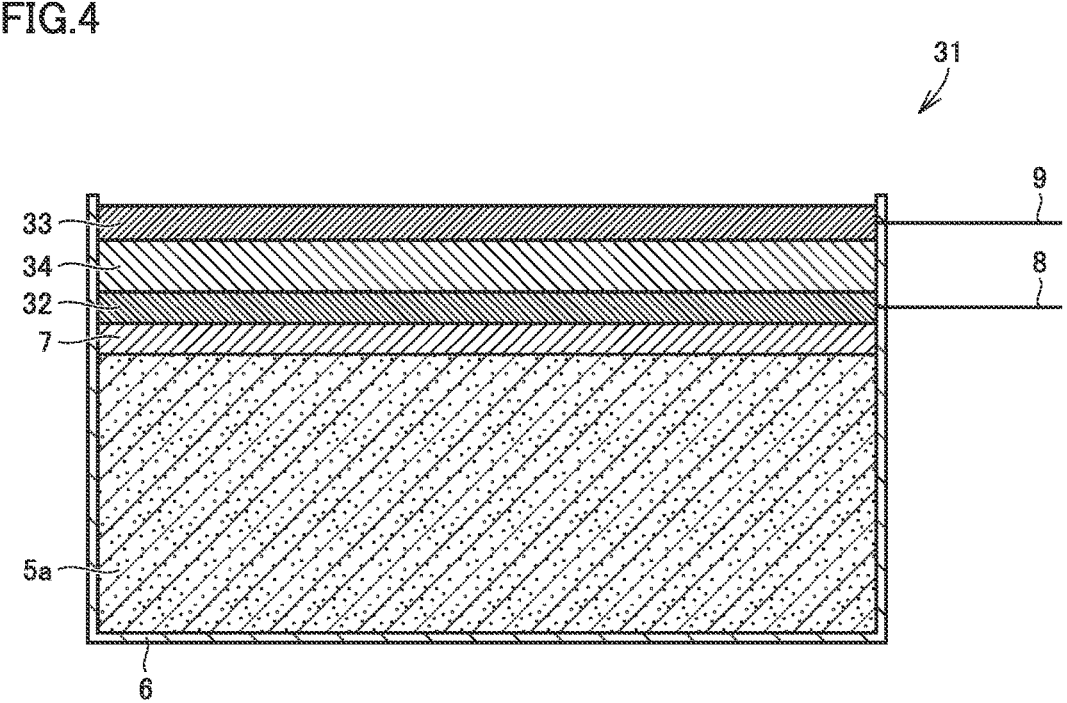
FIG. 4 schematically shows a microbial fuel cell 31 of Embodiment 4 of the first aspect of the invention.

FIG. 4 schematically shows a microbial fuel cell 31 of Embodiment 4 of the first aspect of the invention. In FIG. 4, the part having the same configuration as in the example shown in FIG. 1, 2 or 3 is denoted by the same reference numeral, and the description thereof will be omitted. Microbial fuel cell 31 in the example shown in FIG. 4 is configured in the same manner as microbial fuel cell 1 of the example shown in FIG. 1 except that an anode electrode 32 and a cathode electrode 33 are adjacently arranged in an integrated manner with an oxygen permeation restricting layer 34 interposed therebetween. With such a configuration, it is possible to obtain the oxygen permeation restricting effect for cathode electrode 33 in the same manner as in microbial fuel cell 1 of the example shown in FIG. 1, and it becomes possible to replace anode electrode 32, cathode electrode 33 and oxygen permeation restricting layer 34 at the same time. In addition, advantageously, it is possible to shorten the electrode-electrode distance between anode electrode 32 and cathode electrode 33.

<Embodiment 5 of the First Aspect of the Invention>

Figure 5:
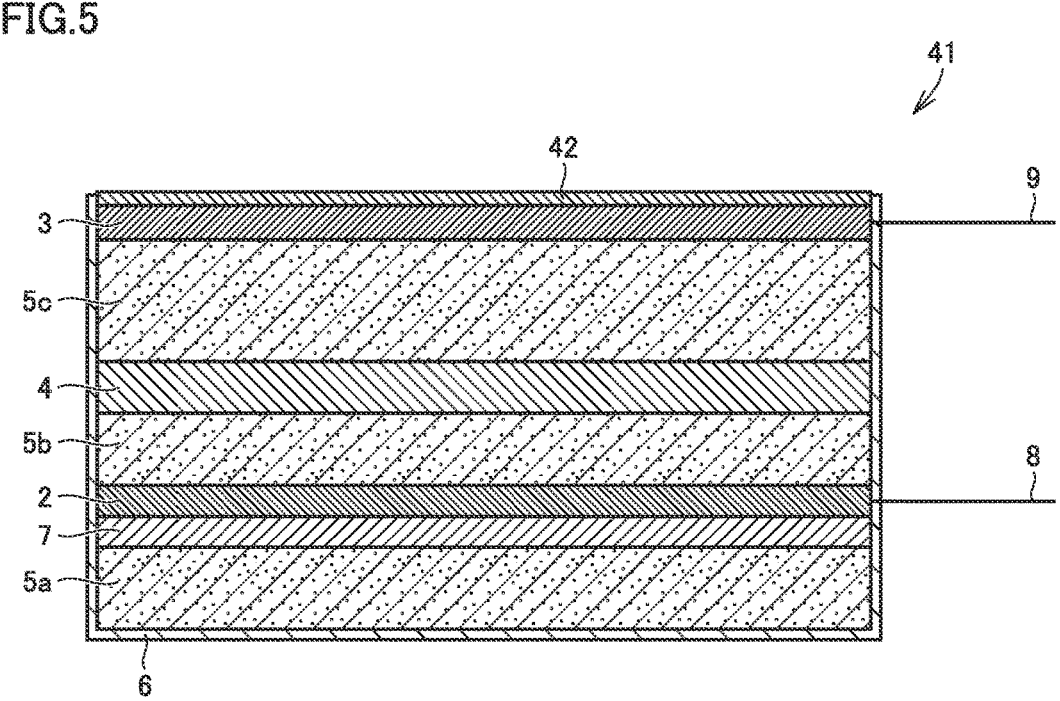
FIG. 5 schematically shows a microbial fuel cell 41 of Embodiment 5 of the first aspect of the invention.

FIG. 5 schematically shows a microbial fuel cell 41 of Embodiment 5 of the first aspect of the invention. In FIG. 5, the part having the same configuration as in the example shown in FIG. 1, 2, 3 or 4 is denoted by the same reference numeral, and the description thereof will be omitted. While the microbial fuel cell of the first aspect of the invention may be open at the upside of cathode electrode 3 as in the example shown in FIG. 1, it may be provided with a moisturizing layer 42 above cathode electrode 3 as in the example shown in FIG. 5 so as to protect microbial fuel cell 41 from dryness. By providing moisturizing layer 42, cathode electrode 3 and soil or mud 5 can be moisturized, so that it is possible to ensure the long-term stability of microbial fuel cell 41.

It is only required that moisturizing layer 42 is capable of storing water of the microbial fuel, and for example, moisturizing layer 42 formed of plastic, a polymer or the like may be put on the cathode electrode as a lid. In that case, while cathode electrode 3 and soil or mud 5 may be blocked from the outside air, it is advantageous to use an oxygen permeable film or the like as moisturizing layer 42 because cathode electrode 3 and soil or mud 5 can be protected from dryness, and oxygen that is consumed at the time of power generation in cathode electrode 3 can be supplemented. In addition, moisturizing layer 42 may be formed of a material that releases water and oxygen, preferably a material capable of moisturizing and supplementing oxygen consumed in the cathode. As such a material, a plant can be preferably used. When a plant is used, it is also possible to grow the plant by utilizing the nutrients contained in soil or mud in the microbial fuel cell.

<Embodiment 6 of the First Aspect of the Invention>

Figure 6:
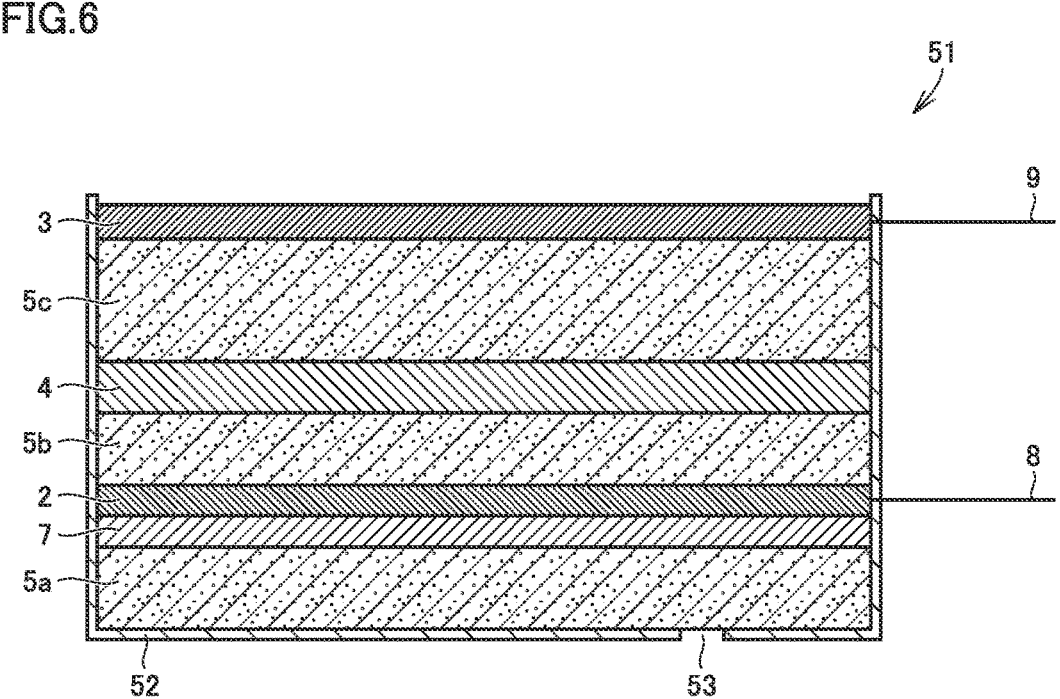
FIG. 6 schematically shows a microbial fuel cell 51 of Embodiment 6 of the first aspect of the invention.

FIG. 6 schematically shows a microbial fuel cell 51 of Embodiment 6 of the first aspect of the invention. In FIG. 6, the part having the same configuration as in the example shown in FIG. 1, 2, 3, 4 or 5 is denoted by the same reference numeral, and the description thereof will be omitted. In microbial fuel cell 51 of the example shown in FIG. 6, a casing 52 has in its bottom face a hole (through-hole) 53 through which microorganisms, nutrients and the like of microbial fuel cell 51 are replaceable from outside. As mentioned above, the microbial fuel cell of the present invention may further be provided with a casing having in its bottom one or more holes through which at least either of the microorganisms and nutrients therefor are replaceable. By using a casing having such a hole, even when current-generating bacteria 7 and nutrients therefor in soil or mud 5 accommodated in casing 52 are reduced, they can be supplemented from outside, so that it is possible to ensure the long-term stability of microbial fuel cell 51. In addition, for example, by embedding the microbial fuel cell in the soil of a farm, it is possible to conduct power generation for a long term, and to utilize the land effectively.

<Embodiment 7 of the First Aspect of the Invention>

Figure 7:
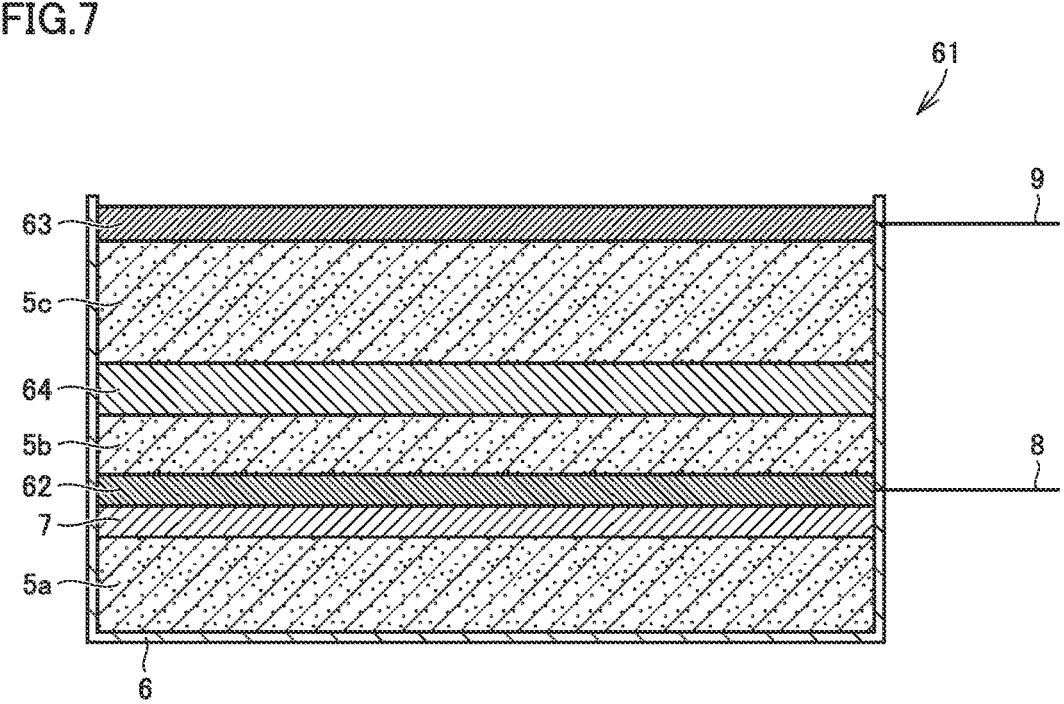
FIG. 7 schematically shows a microbial fuel cell 61 of Embodiment 7 of the first aspect of the invention.

FIG. 7 schematically shows a microbial fuel cell 61 of Embodiment 7 of the first aspect of the invention. In FIG. 7, the part having the same configuration as in the example shown in FIG. 1, 2, 3, 4, 5 or 6 is denoted by the same reference numeral, and the description thereof will be omitted. Microbial fuel cell 61 of the example shown in FIG. 7 is the same as microbial fuel cell 1 shown in FIG. 1 except that each of an anode electrode 62, a cathode electrode 63, and an oxygen permeation restricting layer 64 is separable and replaceable. In the manner as described above, each part of the microbial fuel cell of the present invention may be designed to be individually replaceable, and in that case, it is possible to restore or improve the function of the microbial fuel cell by replacing only a part of the same, for example, by replacing only cathode electrode 63 in the case where only cathode electrode 63 is deteriorated. Thus, it is possible to provide a microbial fuel cell having excellent maintainability.

<Embodiment 8 of the First Aspect of the Invention>

Figure 8:
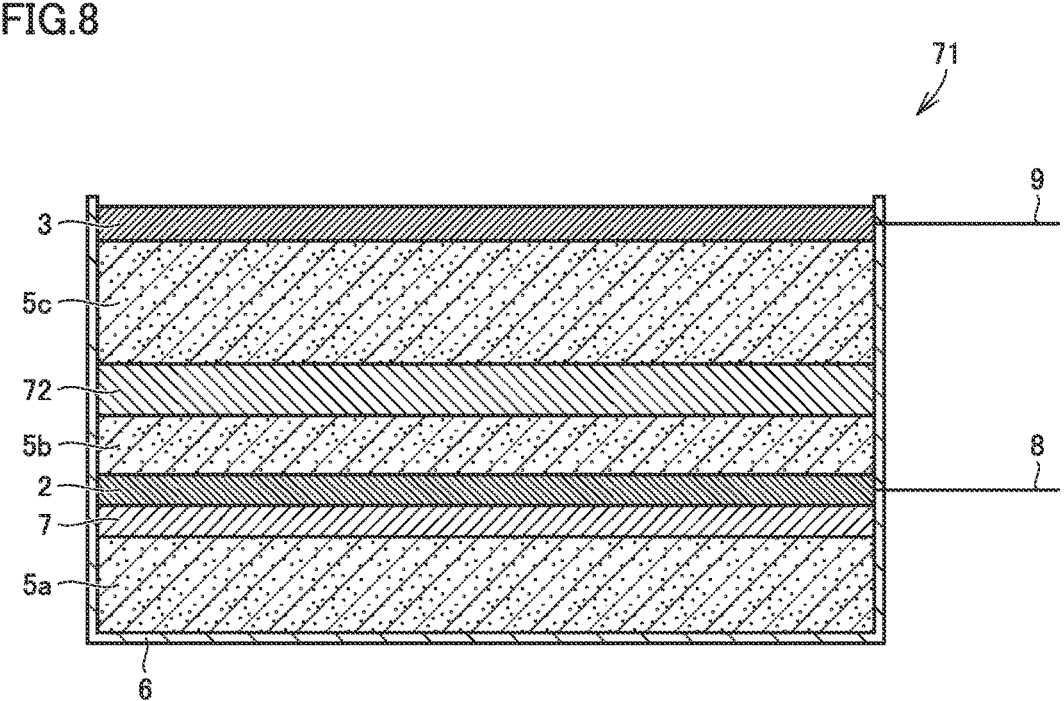
FIG. 8 schematically shows a microbial fuel cell 71 of Embodiment 8 of the first aspect of the invention.

FIG. 8 schematically shows a microbial fuel cell 71 of Embodiment 8 of the first aspect of the invention. In FIG. 8, the part having the same configuration as in the example shown in FIG. 1, 2, 3, 4, 5, 6 or 7 is denoted by the same reference numeral, and the description thereof will be omitted. Microbial fuel cell 71 of the example shown in FIG. 8 is the same as microbial fuel cell 1 of the example shown in FIG. 1 except that an oxygen consuming layer 72 as an oxygen permeation restricting layer is disposed between anode electrode 2 and cathode electrode 3. Also by disposing oxygen consuming layer 72 that consumes oxygen between the anode electrode and the cathode electrode, oxygen consuming layer 72 functions as an oxygen permeation restricting layer, and can prevent oxygen entering from the side of cathode electrode 3 from reaching anode electrode 2. Such oxygen consuming layer 72 may contain, for example, a catalyst that reduces oxygen (for example, glucose oxidase), or may contain a material that absorbs oxygen (for example, an iron compound).

<Embodiment 9 of the First Aspect of the Invention>

Figure 9:
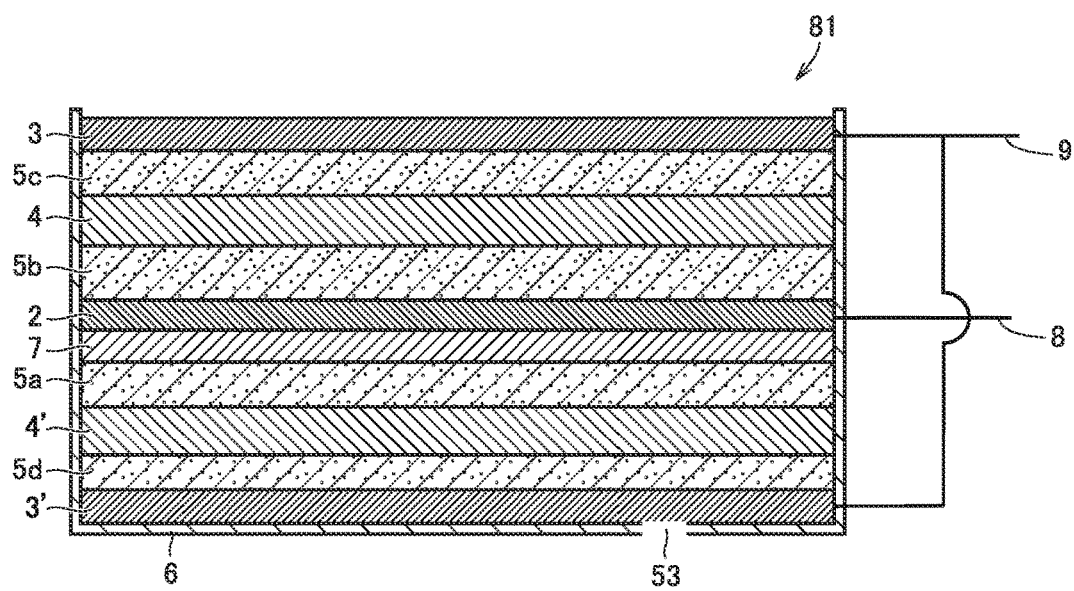
FIG. 9 schematically shows a microbial fuel cell 81 of Embodiment 9 of the first aspect of the invention.

FIG. 9 schematically shows a microbial fuel cell 81 of Embodiment 9 of the first aspect of the invention. In FIG. 9, the part having the same configuration as in the example shown in FIG. 1, 2, 3, 4, 5, 6, 7 or 8 is denoted by the same reference numeral, and the description thereof will be omitted. Microbial fuel cell 81 of the example shown in FIG. 9 is the same as microbial fuel cell 1 of the example shown in FIG. 1 except that an oxygen permeation restricting layer 4', soil or mud 5d, and a cathode electrode 3' are provided in this order on the side of the bottom face of soil or mud 5a, and hole 53 is provided in at least one site in the bottom face of casing 6. With such a form, it is possible to increase the area of the cathode electrode, and thus it is possible to provide a microbial fuel cell having excellent power generating ability.

The present invention also provides a fuel cell including a microorganism-containing layer containing current-generating bacteria and an organic matter; a negative electrode that is disposed in contact with the microorganism-containing layer and that takes out electrons generated through decomposition of the organic matter by the current-generating bacteria; a positive electrode provided for an external environment containing oxygen so that oxygen in the external environment comes into contact therewith, and donating electrons to oxygen; and a greening base layer capable of growing a plant in an upper external environment (hereinafter, the microbial fuel cell is referred to as a "second aspect of the invention").

Conventionally, urban greening for colonizing plants on a rooftop or a wall surface of a building has been conducted. In the urban greening, a method of disposing a soil layer on a building, and making plants take root, a method of artificially immobilizing plants without using a soil layer, and the like are conducted. Urban greening has, for example, the following advantages. In the course of water retention and transpiration by plants (and soil layer), the building is cooled by evaporation heat, the temperature rise inside the building is prevented, and as a result, an energy-saving effect can be obtained. This results in the effect of suppressing the heat island phenomenon over the entire city. In addition, the plants reduce deterioration of the building due to exposure to UV rays, wind and rain, and thus have an effect of prolonging the life span of the building. Further, since carbon dioxide is fixed in the course of photosynthesis by the plants, there is an effect of leading to air cleaning and prevention of global warming. In addition, the plants make it possible to improve the scenic view of the building and the urban landscape.

Here, as a technique having an ecological effect for buildings, power generation utilizing natural energy, such as photovoltaic power generation is known. On the other hand, microbial fuel cells that generate power by the action of microorganisms in soil or mud are known. As a literature in which a microbial fuel cell is disclosed, for example, Japanese Patent Laying-Open No. 2007-324005 (PTD 1) and Japanese Patent Laying-Open No. 2013-84541 (PTD 2) can be recited. PTD 1 discloses a biofuel cell by photosynthetic bacteria. PTD 2 discloses a microbial fuel cell by anaerobic microorganisms.

The present inventors examined provision of a power generating system which is a greening structure and is capable of generating power by effectively utilizing the greening face. The inventors examined use of a photovoltaic power generating system and the microbial fuel cell as described above as a power generating system because they are excellent in cleanness. However, in the case of the photovoltaic power generating system, and the microbial fuel cell described in PTD 1, light is required for generating power, and it is difficult to effectively utilize the greening face that similarly requires light. The microbial fuel cell described in PTD 2 is used in such a manner that the cell cylinder is embedded in sludge, and thus it is difficult to configure a greening face, and thus the microbial fuel cell has not been used as a greening structure.

In order to solve the aforementioned problems, the present invention also provides a microbial fuel cell that is a greening structure and is capable of effectively generating power by utilizing the greening face. That is, the present invention also provides the following microbial fuel cell.

(A) A fuel cell including a microorganism-containing layer containing current-generating bacteria and an organic matter; a negative electrode that is disposed in contact with the microorganism-containing layer and that takes out electrons generated through decomposition of the organic matter by the current-generating bacteria; a positive electrode provided for an external environment containing oxygen so that oxygen in the external environment comes into contact therewith, and donating electrons to oxygen; and a greening base layer capable of growing a plant in an upper external environment (hereinafter, the microbial fuel cell is referred to as a "second aspect of the invention").

(B) In the microbial fuel cell of the second aspect of the invention, the positive electrode functions also as a greening base layer.

(C) In the microbial fuel cell of the second aspect of the invention, the greening base layer is detachably provided.

(D) The microbial fuel cell of the second aspect of the invention further includes an ion conductive membrane disposed between the positive electrode and the negative electrode.

(E) In the microbial fuel cell of the second aspect of the invention, the microorganism-containing layer preferably contains soil.

(F) In the microbial fuel cell of the second aspect of the invention, the plant is a hepatic plant.

With the microbial fuel cell of the second aspect of the invention, it is possible to provide a microbial fuel cell that is a greening structure and is capable of effectively generating power by utilizing the greening face.

The microbial fuel cell of the second aspect of the invention includes a microorganism-containing layer containing current-generating bacteria and an organic matter; a negative electrode that is disposed in contact with the microorganism-containing layer and that takes out electrons generated through decomposition of the organic matter by the current-generating bacteria; a positive electrode provided for an external environment containing oxygen so that oxygen in the external environment comes into contact therewith, and donating electrons to oxygen; and a greening base layer capable of growing a plant in an upper external environment. Hereinafter, the microbial fuel cell of the second aspect of the invention will be described more specifically by illustrating embodiments. In the microbial fuel cell of each embodiment specifically described below, a negative electrode-side soil layer is provided as a microorganism-containing layer.

<Embodiment 1 of the Second Aspect of the Invention>

Figure 12:
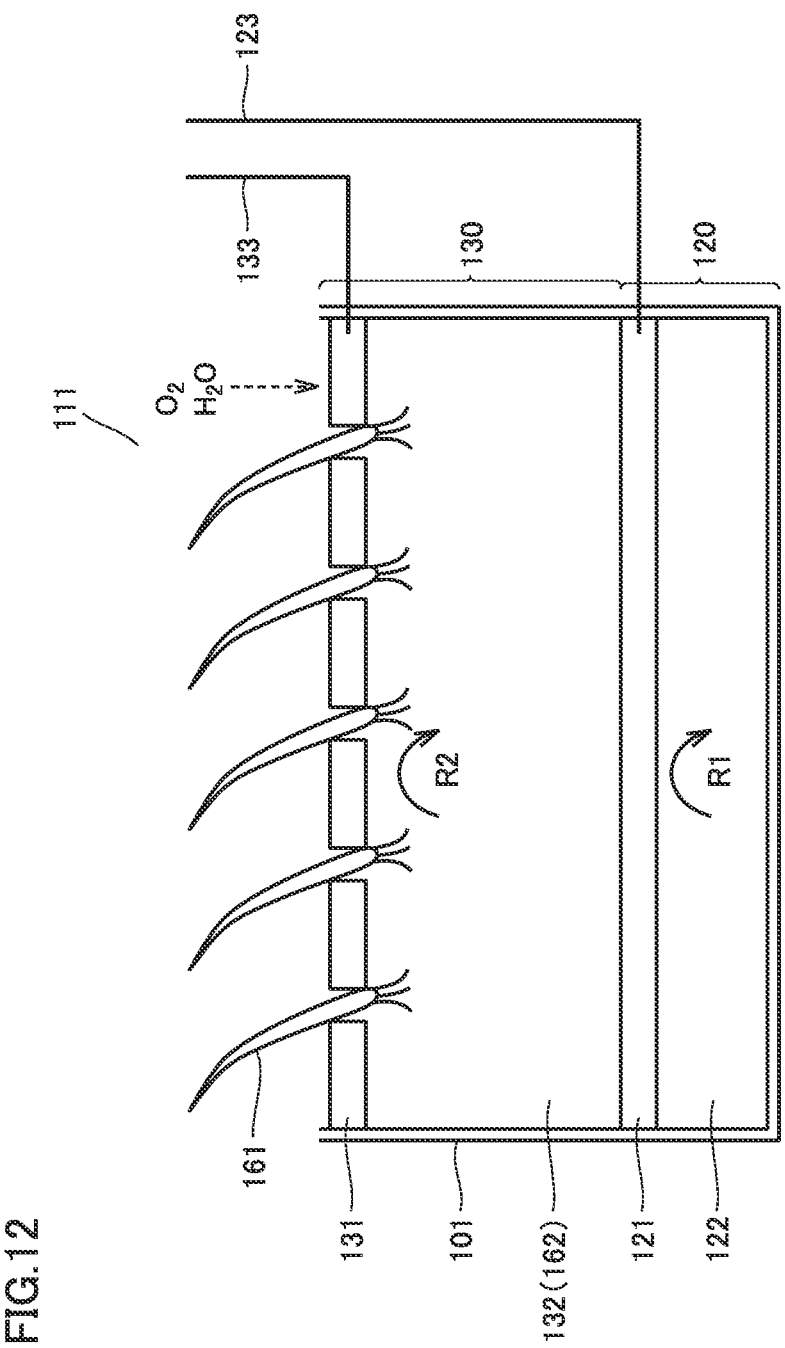
FIG. 12 is a sectional view schematically showing a configuration of a microbial fuel cell 111 of Embodiment 1 of a second aspect of the invention.

FIG. 12 is a sectional view schematically showing a configuration of a microbial fuel cell 111 of Embodiment 1 of the second aspect of the invention. Microbial fuel cell 111 shown in FIG. 12 has a casing 101 having an opening on the upside, and is provided with a negative electrode part 120 and a positive electrode part 130 from the downside of casing 101. A positive electrode-side soil layer 132 inside positive electrode part 130 functions also as a greening base layer capable of growing a plant 161 in an upper external environment. Negative electrode part 120 and positive electrode part 130 are provided in contact with each other so that ions can migrate between these parts.

(Negative Electrode Part)

Negative electrode part 120 has a negative electrode-side soil layer 122, and a negative electrode 121 disposed in contact with negative electrode-side soil layer 122. In FIG. 12, negative electrode 121 is disposed above negative electrode-side soil layer 122 in such a manner that the lower part of negative electrode 121 is in contact with negative electrode-side soil layer 122. Without limited to such an arrangement, negative electrode 121 may be disposed inside negative electrode-side soil layer 122 or below negative electrode-side soil layer 122 as long as it is in contact with negative electrode-side soil layer 122.

Negative electrode-side soil layer 122 is soil that contains current-generating bacteria and an organic matter that can be metabolized by the current-generating bacteria, and may contain various nutritional supplements as necessary. Negative electrode-side soil layer 122 is, for example, leaf mold. The water content of negative electrode-side soil layer 122 is not particularly limited, and negative electrode-side soil layer 122 may be in a mud state having a high water content. Negative electrode-side soil layer 122 is not necessarily limited to soil, but may be an aqueous solution containing current-generating bacteria and an organic matter that can be metabolized by the current-generating bacteria, or an insulating material containing the same (for example, rock wool or absorbent cotton). In negative electrode-side soil layer 122, the reaction in which the current-generating bacteria decompose the organic matter as shown below (reaction R1) occurs and electrons are released, and the released electrons are taken outside by negative electrode 121 in contact with negative electrode-side soil layer 122 through negative electrode wiring 123.

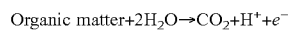

Organic matter+$2H_2O \rightarrow CO_2 + H^+ + e^-$     (reaction R1)

Current-generating bacteria are bacteria that decompose organic matters such as sugar and acetic acid and release electrons, and for example, *Shewanella* bacteria can be recited. In Embodiment 1 of the second aspect of the invention, the oxygen concentration is preferably low in the vicinity of negative electrode 121, and thus negative electrode-side soil layer 122 is disposed below positive electrode part 130 so that oxygen is hardly supplied to negative electrode-side soil layer 122. Therefore, the current-generating bacteria are preferably anaerobic bacteria.

Negative electrode 121 is preferably formed of a carbon material having high corrosion resistance, for example, carbon felt, or a material obtained by coating a metal base with carbon. As the metal base, those formed of SUS and having a mesh form with large surface area are preferably used. As a method for carbon coating, carbon plating with a molten salt, nonwoven fabric spraying, carbon-containing coating, sputtering and the like can be recited.

Negative electrode wiring 123 is preferably formed of SUS or the like having high corrosion resistance, and may be further coated with an insulating resin or the like.

(Positive Electrode Part)

Positive electrode part 130 has positive electrode-side soil layer 132, and a positive electrode 131 disposed in contact with positive electrode-side soil layer 132. In FIG. 12, positive electrode 131 is disposed above positive electrode-side soil layer 132 in such a manner that the lower part of positive electrode 131 is in contact with positive electrode-side soil layer 132. Without limited to such an arrangement, positive electrode 131 may be disposed inside positive electrode-side soil layer 132 or below positive electrode-side soil layer 132 as long it is in contact with positive electrode-side soil layer 132, it is not electrified by negative electrode 121, and it does not interfere with positive electrode-side soil layer 132 functioning as a greening base layer. However, since it is preferred to dispose positive electrode 131 at the position where the oxygen concentration is high, positive electrode 131 is preferably disposed above positive electrode-side soil layer 132, namely on the opening side.

In Embodiment 1 of the second aspect of the invention, positive electrode-side soil layer 132 is formed of a greening base capable of growing plant 161 so as to function also as a greening base layer 162. Positive electrode-side soil layer 132 is capable of taking in oxygen and water supplied to plant 161. The greening base used herein is formed of, for example, soil or peat, and may contain various fertilizers as needed. Positive electrode-side soil layer 132 is not necessarily limited to be soil, and it may be an aqueous solution containing oxygen, and nutrients for plant 161, or an insulating material containing the same (for example, rock wool or absorbent cotton). In positive electrode-side soil layer 132, electrons are donated to oxygen from positive electrode 131 that is in contact with positive electrode-side soil layer 132, and the following reaction (reaction R2) which is reduction of oxygen occurs. Hydrogen ions ($H^+$) produced in reaction R1 in negative electrode-side soil layer 122 migrate to positive electrode-side soil layer 132, and are used as hydrogen ions ($H^+$) in reaction R2.

$$O_2 + 4H^+ + 4e^- \rightarrow 2H_2O \quad \text{(reaction R2)}$$

Positive electrode 131 is preferably a material having oxygen reducing ability, or a material coated with such a material. For example, besides platinum, gold, carbon and the like, carbon modified with a platinum catalyst, carbon modified with an enzyme catalyst having oxygen reducing ability, carbon modified with a microorganism, and the like can be used. Considering the cost and the ease of production, positive electrode 131 is preferably formed of a carbon material having high corrosion resistance, and for example, carbon felt, or a material obtained by coating a metal base with carbon can be used. As the metal base, those formed of SUS and having a mesh form with large surface area are preferably used. As a method for carbon coating, carbon plating with a molten salt, nonwoven fabric spraying, carbon-containing coating, sputtering and the like can be recited.

Positive electrode 131 has a plurality of through-holes through which plant 161 can penetrate so as not to prevent plant 161 from growing upward. By providing positive electrode 131 with the through-holes, positive electrode-side soil layer 132 can easily take in oxygen and water in the upper external environment, or oxygen and water supplied to plant 161.

Positive electrode wiring 133 is preferably formed of SUS or the like having high corrosion resistance, and may be further coated with an insulating resin or the like.

(Greening Base Layer)

In microbial fuel cell 111 of Embodiment 1 of the second aspect of the invention, positive electrode-side soil layer 132 also serves as greening base layer 162 as described above. Greening base layer 162 is so configured that it is capable of growing plant 161 in the upper external environment. Plant 161 may be vegetated in the condition that it has grown in greening base layer 162, or may be grown from a seed using a greening base containing a seed of plant 161. The kind of plant 161 is not particularly limited, and various plants such as algae, liverworts, gramineous plants, and leguminous plants can be used. Liverworts are preferred because they can vegetate in a small amount of soil, and thus it is possible to reduce the amount of soil in greening base layer 162.

(Casing)

In microbial fuel cell 111 of Embodiment 1 of the second aspect of the invention, casing 101 is formed of an insulating member or an insulation-treated material that prevents electrification at least between negative electrode 121 and positive electrode 131.

(Use and Effect)

In microbial fuel cell 111 of Embodiment 1 of the second aspect of the invention, electromotive force is generated between negative electrode wiring 123 and positive electrode wiring 133 by reaction R1 and reaction R2 described above. The electromotive force generated by microbial fuel cell 111 of Embodiment 1 of the second aspect of the invention can be used as a power source for actuating an electric device, and also the condition (for example, wetness and nutrients) of greening base layer 162 can be detected by monitoring the magnitude of the generated electromotive force.

Since microbial fuel cell 111 of Embodiment 1 of the second aspect of the invention has greening base layer 162, it can be used for roof greening and wall greening. In greening base layer 162, migration of ions occurs because greening base layer 162 also serves as positive electrode-side soil layer 132. Therefore, by controlling migration of ions in greening base layer 162, it is possible to adjust the growth of plant 161.

Further, in microbial fuel cell 111 of Embodiment 1 of the second aspect of the invention, since positive electrode 131 can utilize oxygen in the external environment or oxygen supplied to plant 161 for reaction R2, it is possible to reduce the frequency of maintenance of positive electrode-side soil layer 132.

<Embodiment 2 of the Second Aspect of the Invention>

Figure 13:
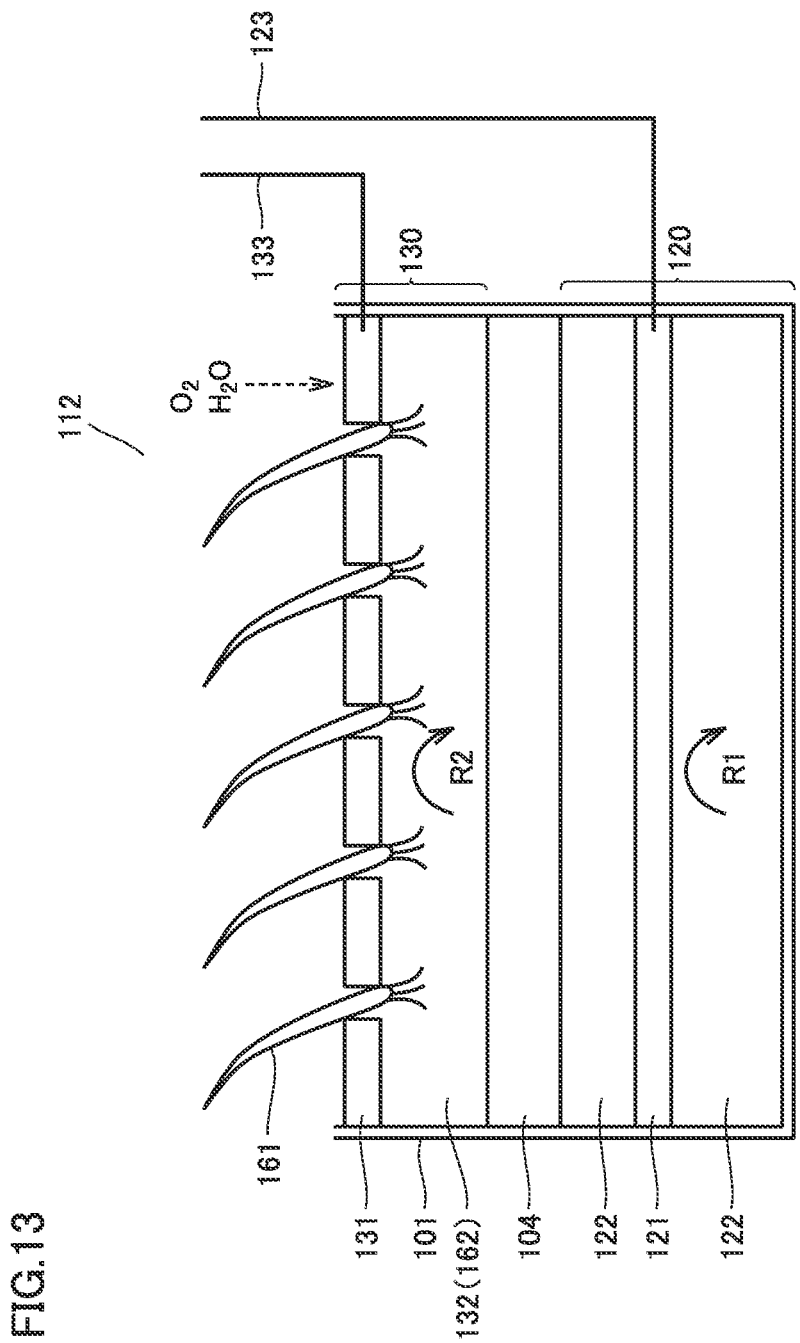
FIG. 13 is a sectional view schematically showing a configuration of a microbial fuel cell 112 of Embodiment 2 of the second aspect of the invention.

FIG. 13 is a sectional view schematically showing a configuration of a microbial fuel cell 112 of Embodiment 2 of the second aspect of the invention. Microbial fuel cell 112 shown in FIG. 13 has casing 101 having an opening on the upside, and is provided with negative electrode part 120 and positive electrode part 130 from the downside of casing 101. Positive electrode-side soil layer 132 inside positive electrode part 130 functions as a greening base layer capable of growing plant 161 in an upper external environment. Negative electrode part 120 and positive electrode part 130 are provided with an ion conductive membrane 104 interposed therebetween so that ions can migrate between these parts.

Microbial fuel cell 112 of Embodiment 2 of the second aspect of the invention is different from the configuration of Embodiment 1 of the second aspect of the invention in that ion conductive membrane 104 is provided between negative electrode part 120 and positive electrode part 130, and in negative electrode part 120, negative electrode 121 is provided inside negative electrode-side soil layer 122. Hereinafter, only the part having difference from that in microbial fuel cell 111 of Embodiment 1 of the second aspect of the invention will be described.

(Ion Conductive Membrane)

Ion conductive membrane 104 is a membrane having ion conductivity. Therefore, hydrogen ions ($H^+$) generated in reaction R1 in negative electrode part 120 permeate ion conductive membrane 104 and migrate to positive electrode part 130, and used as hydrogen ions ($H^+$) in reaction R2 in the positive electrode part. Since ion conductive membrane 104 is capable of suppressing or blocking migration of oxygen from positive electrode part 130 to negative electrode part 120, reaction R1 in the case where current-generating bacteria which are anaerobic bacteria are used can be advanced more efficiently.

Ion conductive membrane 104 can be formed, for example, by mixing a salt such as potassium chloride or sodium chloride in agar-agar. As ion conductive membrane 104, a commercially available Nafion (registered trade name, available from Du Pont) membrane or the like may be used. Further, an oxygen absorbent may be added to ion conductive membrane 104. As an oxygen absorbent, for example, organic matters having oxygen reducing ability, inorganic matters having oxygen adsorptivity or the like can be used. Ion conductive membrane 104 is disposed between positive electrode part 130 and negative electrode part 120, and is disposed in such a manner that its upper face is in contact with positive electrode-side soil layer 132 and its lower face is in contact with negative electrode-side soil layer 122 in FIG. 13. Depending on the configuration of positive electrode part 130 and negative electrode part 120, ion conductive membrane 104 may be in direct contact with positive electrode 131 or negative electrode 121.

(Use and Effect)

In microbial fuel cell 112 of Embodiment 2 of the second aspect of the invention, electromotive force is generated between negative electrode wiring 123 and positive electrode wiring 133 by reaction R1 and reaction R2 described above. The electromotive force generated by microbial fuel cell 112 of Embodiment 2 of the second aspect of the invention can be used as a power source for actuating an electric device, and also the condition (for example, wetness and nutrients) of greening base layer 162 can be detected by monitoring the magnitude of the generated electromotive force.

Since microbial fuel cell 112 of Embodiment 2 of the second aspect of the invention has greening base layer 162, it can be used for roof greening and wall greening. In greening base layer 162, migration of ions occurs because greening base layer 162 also serves as positive electrode-side soil layer 132. Therefore, by controlling migration of ions in greening base layer 162, it is possible to adjust the growth of plant 161.

In microbial fuel cell 112 of Embodiment 2 of the second aspect of the invention, by using ion conductive membrane 104, it is possible to increase the amount of power generation, and to thin the cell for obtaining the same amount of power. Therefore, it becomes possible to configure the microbial fuel cell to have lighter weight, and this is useful when the cell is used for roof greening or wall greening.

Further, in microbial fuel cell 112 of Embodiment 2 of the second aspect of the invention, since positive electrode 131 can utilize oxygen in the external environment or oxygen supplied to plant 161 for reaction R2, it is possible to reduce the frequency of maintenance of positive electrode-side soil layer 132.

<Embodiment 3 of the Second Aspect of the Invention>

Figure 14:
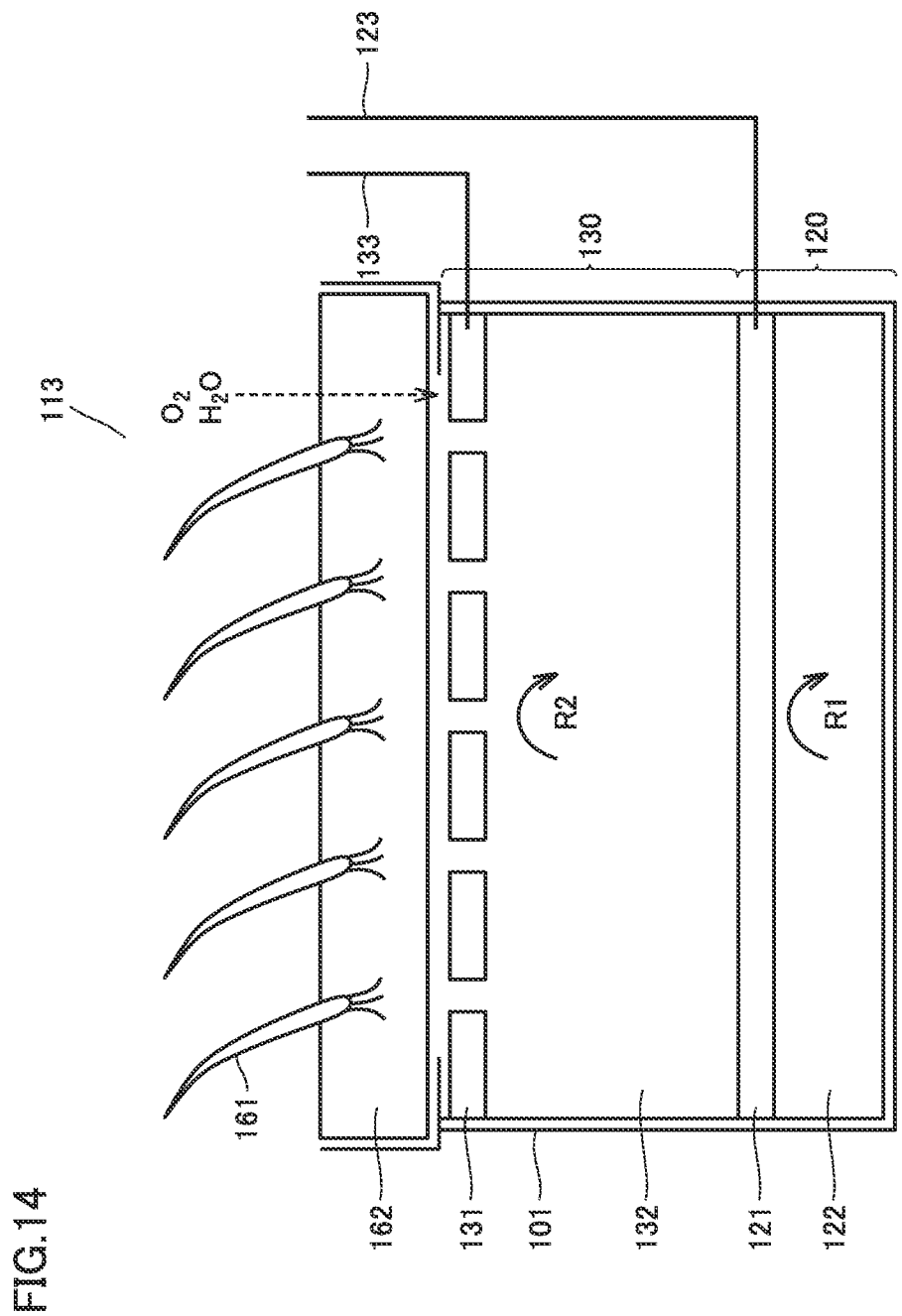
FIG. 14 is a sectional view schematically showing a configuration of a microbial fuel cell 113 of Embodiment 3 of the second aspect of the invention.

FIG. 14 is a sectional view schematically showing a configuration of a microbial fuel cell 113 of Embodiment 3 of the second aspect of the invention. Microbial fuel cell 113 shown in FIG. 14 has casing 101 having an opening on the upside, and is provided with negative electrode part 120 and positive electrode part 130 from the downside of casing 101. Above the opening of casing 101, greening base layer 162 is further provided in a detachable manner Negative electrode part 120 and positive electrode part 130 are disposed in contact with each other so that ions can migrate between these parts. Between negative electrode part 120 and positive electrode part 130, an ion conductive membrane as is provided in microbial fuel cell 112 of Embodiment 2 of the second aspect of the invention may be provided. By providing the ion conductive membrane, it is possible to increase the amount of power generation.

Microbial fuel cell 113 of Embodiment 3 of the second aspect of the invention is different from the configuration of microbial fuel cell 111 of Embodiment 1 of the second aspect of the invention only in that greening base layer 162 is provided above the opening of casing 101 separately from positive electrode part 130, and positive electrode-side soil layer 132 of positive electrode part 130 is not configured to also serve as greening base layer 162. Positive electrode 131 is configured to have a plurality of through-holes as with microbial fuel cell 111 of Embodiment 1 of the second aspect of the invention, and positive electrode-side soil layer 132 can easily take in oxygen and water in the upper external environment, or oxygen and water supplied to plant 161 vegetated in greening base layer 162 above. Hereinafter, only the part having difference from that in microbial fuel cell 111 of Embodiment 1 of the second aspect of the invention will be described.

(Greening Base Layer)

Greening base layer 162 is as described in microbial fuel cell 111 of Embodiment 1 of the second aspect of the invention except that it does not serve also as positive electrode-side soil layer 132, and it is detachably attached above the opening of casing 101.

(Use and Effect)

In microbial fuel cell 113 of Embodiment 3 of the second aspect of the invention, electromotive force is generated between negative electrode wiring 123 and positive electrode wiring 133 by reaction R1 and reaction R2 described above. The electromotive force generated by microbial fuel cell 113 of Embodiment 3 of the second aspect of the invention can be used as a power source for actuating an electric device.

Since microbial fuel cell 113 of Embodiment 3 of the second aspect of the invention has greening base layer 162, it can be used for roof greening and wall greening. Since greening base layer 162 is easily detachable, it is possible to easily replace plant 161 in accordance with the condition of plant 161, season and the like.

Further, in microbial fuel cell 113 of Embodiment 3 of the second aspect of the invention, since positive electrode 131 can utilize oxygen in the external environment or oxygen supplied to plant 161 for reaction R2, it is possible to reduce the frequency of maintenance of positive electrode-side soil layer 132.

<Embodiment 4 of the Second Aspect of the Invention>

Figure 15:
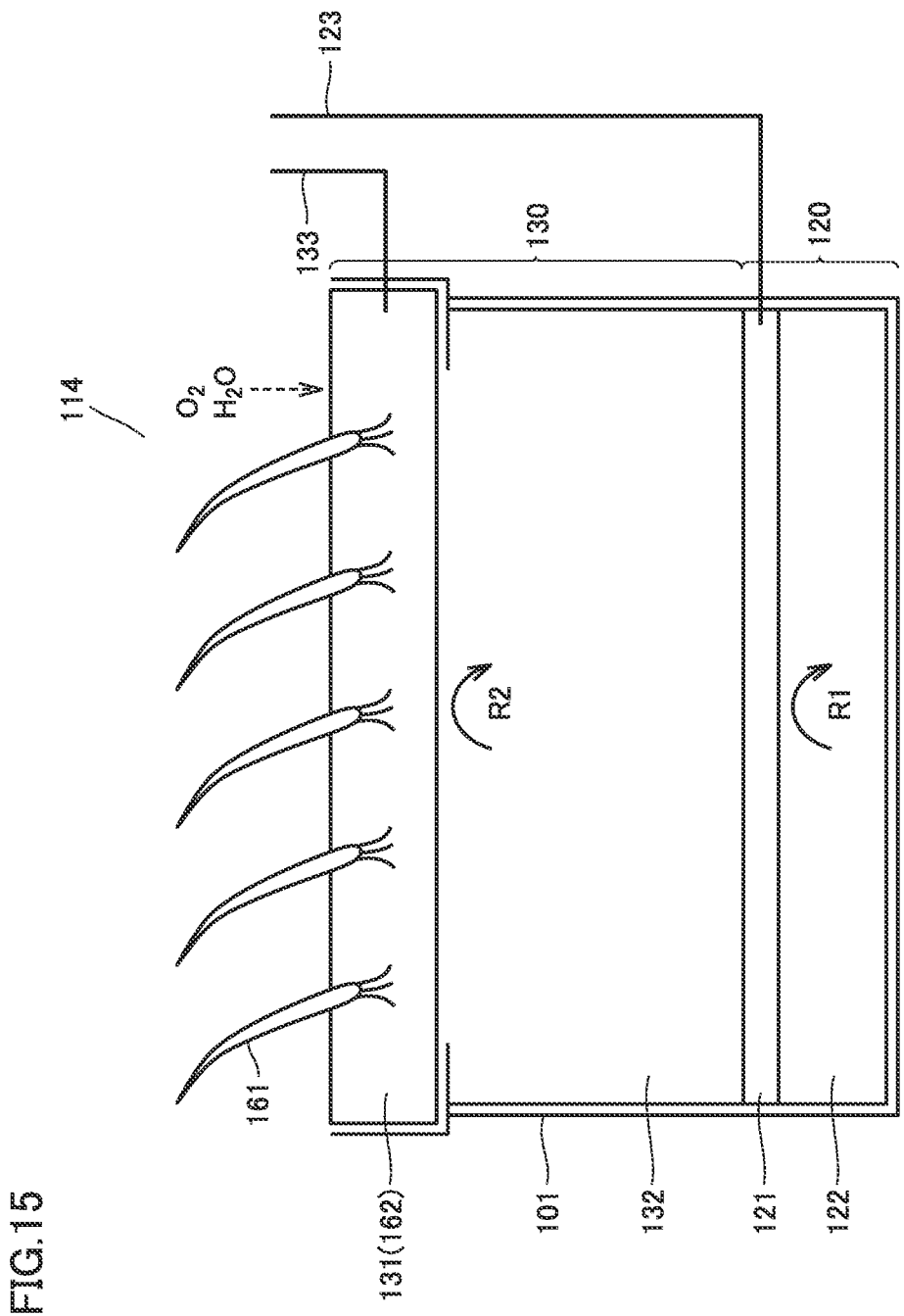
FIG. 15 is a sectional view schematically showing a configuration of a microbial fuel cell 114 of Embodiment 4 of the second aspect of the invention.

FIG. 15 is a sectional view schematically showing a configuration of a microbial fuel cell 114 of Embodiment 4 of the second aspect of the invention. Microbial fuel cell 114 shown in FIG. 15 has casing 101 having an opening on the upside, and is provided with negative electrode part 120, and positive electrode-side soil layer 132 of positive electrode part 130 from the downside of casing 101. Above the opening of casing 101, positive electrode 131 of positive electrode part 130 is further provided in a detachable manner Positive electrode 131 functions also as a greening base layer capable of growing plant 161 in an upper external environment. Negative electrode part 120 and positive electrode part 130 are provided in contact with each other so that ions can migrate between these parts. Between negative electrode part 120 and positive electrode part 130, an ion conductive membrane as is provided in microbial fuel cell 112 of Embodiment 2 of the second aspect of the invention may be provided. By providing the ion conductive membrane, it is possible to increase the amount of power generation.

Microbial fuel cell 114 of Embodiment 4 of the second aspect of the invention is different from the configuration of microbial fuel cell 111 of Embodiment 1 of the second aspect of the invention only in that positive electrode 131 rather than positive electrode-side soil layer 132 of positive electrode part 130 is configured to also serve as greening base layer 162, and that positive electrode 131 is detachably provided above the opening of casing 101. Hereinafter, only the part having difference from that in microbial fuel cell 111 of Embodiment 1 of the second aspect of the invention will be described.

(Positive Electrode)

In microbial fuel cell 114 of Embodiment 4 of the second aspect of the invention, positive electrode 131 is not particularly limited as long as it has a conductive material and a greening base, and it is detachable. For example, mention may be made of a configuration in which a mesh-like metal base coated with carbon, and a greening base in the metal base are provided, and they are integrally retained in a detachable manner. The greening base and plant 161 are as described in Embodiment 1 of the second aspect of the invention.

(Use and Effect)

In microbial fuel cell 114 of Embodiment 4 of the second aspect of the invention, electromotive force is generated between negative electrode wiring 123 and positive electrode wiring 133 by reaction R1 and reaction R2 described above. The electromotive force generated by microbial fuel cell 114 of Embodiment 4 of the second aspect of the invention can be used as a power source for actuating an electric device.

Since microbial fuel cell 114 of Embodiment 4 of the second aspect of the invention has greening base layer 162, it can be used for roof greening and wall greening. Since positive electrode 131 serving also as greening base layer 162 is easily detachable, it is possible to easily replace plant 161 in accordance with the condition of plant 161, season and the like.

Further, in microbial fuel cell 114 of Embodiment 4 of the second aspect of the invention, since positive electrode 131 can utilize oxygen in the external environment or oxygen supplied to plant 161 for reaction R2, it is possible to reduce the frequency of maintenance of positive electrode-side soil layer 132.

<Embodiment 5 of the Second Aspect of the Invention>

Figure 16:
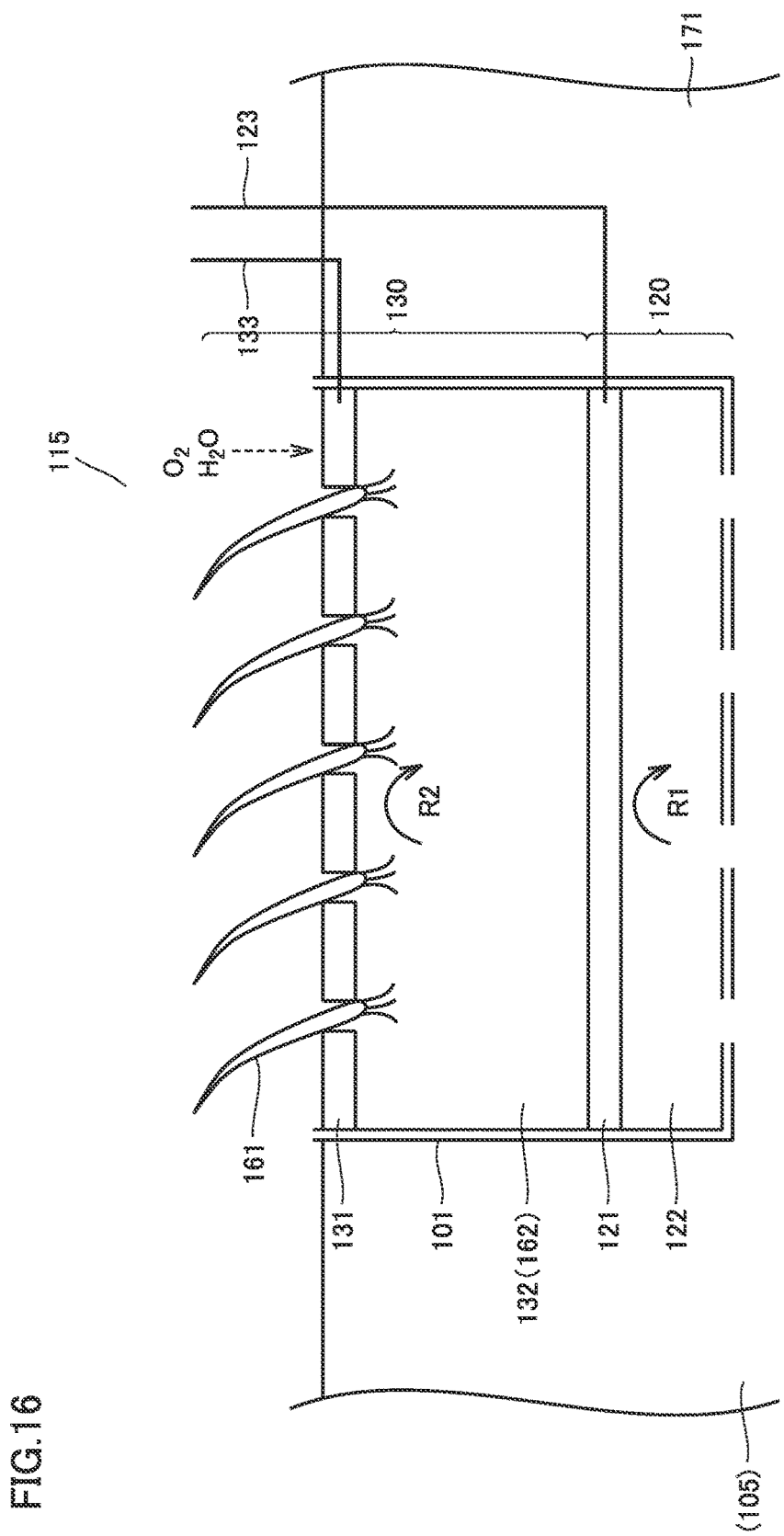
FIG. 16 is a sectional view schematically showing a configuration of a microbial fuel cell 115 of Embodiment 5 of the second aspect of the invention.

FIG. 16 is a sectional view schematically showing a configuration of a microbial fuel cell 115 of Embodiment 5 of the second aspect of the invention. Microbial fuel cell 115 shown in FIG. 16 has casing 101 having an opening on the upside, and is provided with negative electrode part 120, and positive electrode-side soil layer 132 of positive electrode part 130 from the downside of casing 101. Positive electrode-side soil layer 132 in positive electrode part 130 functions also as a greening base layer capable of growing plant 161 in an upper external environment. Negative electrode part 120 and positive electrode part 130 are provided in contact with each other so that ions can migrate between these parts. Between negative electrode part 120 and positive electrode part 130, an ion conductive membrane as is provided in microbial fuel cell 112 of Embodiment 2 of the second aspect of the invention may be provided. By providing the ion conductive membrane, it is possible to increase the amount of power generation.

Microbial fuel cell 115 of Embodiment 5 of the second aspect of the invention is different from the configuration of microbial fuel cell 111 of Embodiment 1 of the second aspect of the invention only in that a plurality of through-holes are provided in a bottom face of casing 101. Microbial fuel cell 115 of Embodiment 5 of the second aspect of the invention can be used in a state of being embedded in soil layer 171, and when microbial fuel cell 115 is used in this manner, current-generating bacteria and organic matters to be decomposed are continuously supplied to negative electrode-side soil layer 122 from soil layer 171 which is an external environment.

(Use and Effect)

In microbial fuel cell 115 of Embodiment 5 of the second aspect of the invention, electromotive force is generated between negative electrode wiring 123 and positive electrode wiring 133 by reaction R1 and reaction R2 described above. The electromotive force generated by microbial fuel cell 115 of Embodiment 5 of the second aspect of the invention can be used as a power source for actuating an electric device.

Since microbial fuel cell 115 of Embodiment 5 of the second aspect of the invention has greening base layer 162, and can be used in a state of being embedded in soil layer 171, microbial fuel cell 115 can be used for greening of a large-scale land such as a farm or a playground, for example. In addition, since current-generating bacteria and organic matters to be decomposed are continuously supplied to negative electrode-side soil layer 122 from soil layer 171 which is an external environment, reaction R1 in negative electrode part 120 is easy to occur in a stable manner, and stable power generation for a long term is possible.

Further, in microbial fuel cell 115 of Embodiment 5 of the second aspect of the invention, since positive electrode 131 can utilize oxygen in the external environment or oxygen supplied to plant 161 for reaction R2, it is possible to reduce the frequency of maintenance of positive electrode-side soil layer 132.

<Embodiment 6 of the Second Aspect of the Invention>

Figure 17:
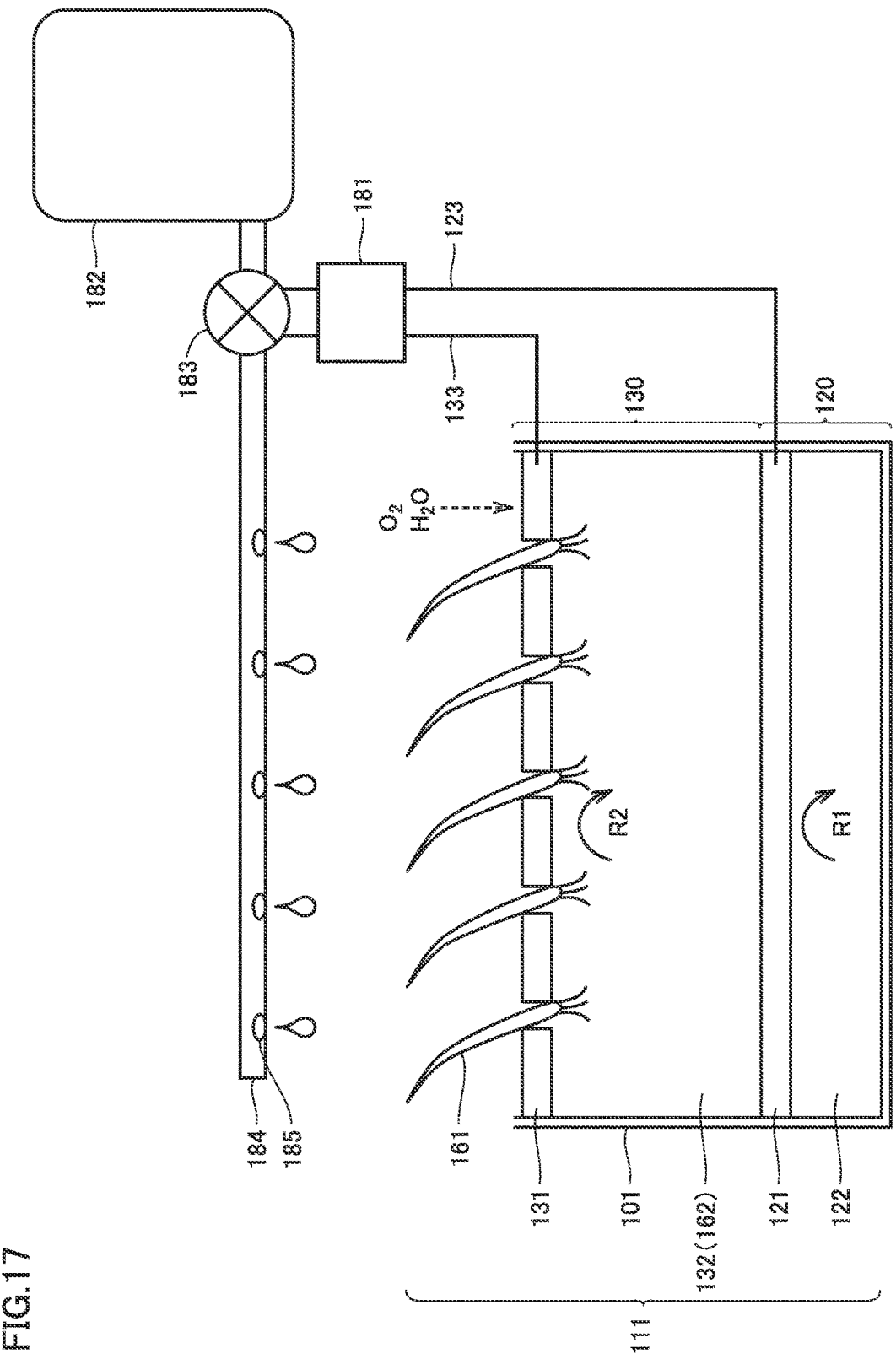
FIG. 17 is a sectional view schematically showing a system of Embodiment 6 of the second aspect of the invention that includes a microbial fuel cell.

FIG. 17 is a sectional view schematically showing a system of Embodiment 6 of the second aspect of the invention that includes a microbial fuel cell. The system shown in FIG. 17 is configured by using microbial fuel cell 111 of Embodiment 1 of the second aspect of the invention.

In the system of Embodiment 6 of the second aspect of the invention, in addition to microbial fuel cell 111, a control circuit 181 for conducting control by electromotive force obtained between negative electrode wiring 123 and positive electrode wiring 133, a water storage tank 182 in which water is stored in advance, a water-pouring pipe 184 connected with water storage tank 182, and an electromagnetic valve 183 for switching connection between water storage tank 182 and water-pouring pipe 184 are provided.

Electric energy obtained between negative electrode wiring 123 and positive electrode wiring 133 is used for opening/closing electromagnetic valve 183 at a predetermined time by control circuit 181. As electromagnetic valve 183 is opened, the water in water storage tank 182 flows into water-pouring pipe 184 by the water pressure, and water is dropped to plant 161 through water orifices 185 provided in water-pouring pipe 184. Electromagnetic valve 183 is closed again by electric energy obtained between negative electrode wiring 123 and positive electrode wiring 133 at a predetermined time.

According to Embodiment 6 of the second aspect of the invention, since a system capable of automatically supplying plant 161 with water is realized, the maintenance of plant 161 is facilitated. Further, control circuit 181 preferably has a function of storing electric power for allowing use of electric power for other purposes than opening/closing of electromagnetic valve 183. As water in water storage tank 182, for example, pooled rainwater may be used, or tap water may be used. A pump may be used in place of electromagnetic valve 183.

In FIG. 17, while a system is configured by using microbial fuel cell 111 of Embodiment 1 of the second aspect of the invention, a system can be configured in the same manner by using microbial fuel cells of Embodiments 2 to 5 of the second aspect of the invention. Applications of the microbial fuel cells of Embodiments 1 to 5 of the second aspect of the invention are not limited to these, and various devices can be employed as a device serving as a load. For example, by illuminating LED by the obtained power, it is possible to use the microbial fuel cell as illumination and decorative illumination of the greening site. In addition, the power generated by the microbial fuel cell can be used as a power source for various sensors, and for example, a motion sensor can be provided in the greening site for preventing crimes.

<Embodiment 7 of the Second Aspect of the Invention>

Figure 18:
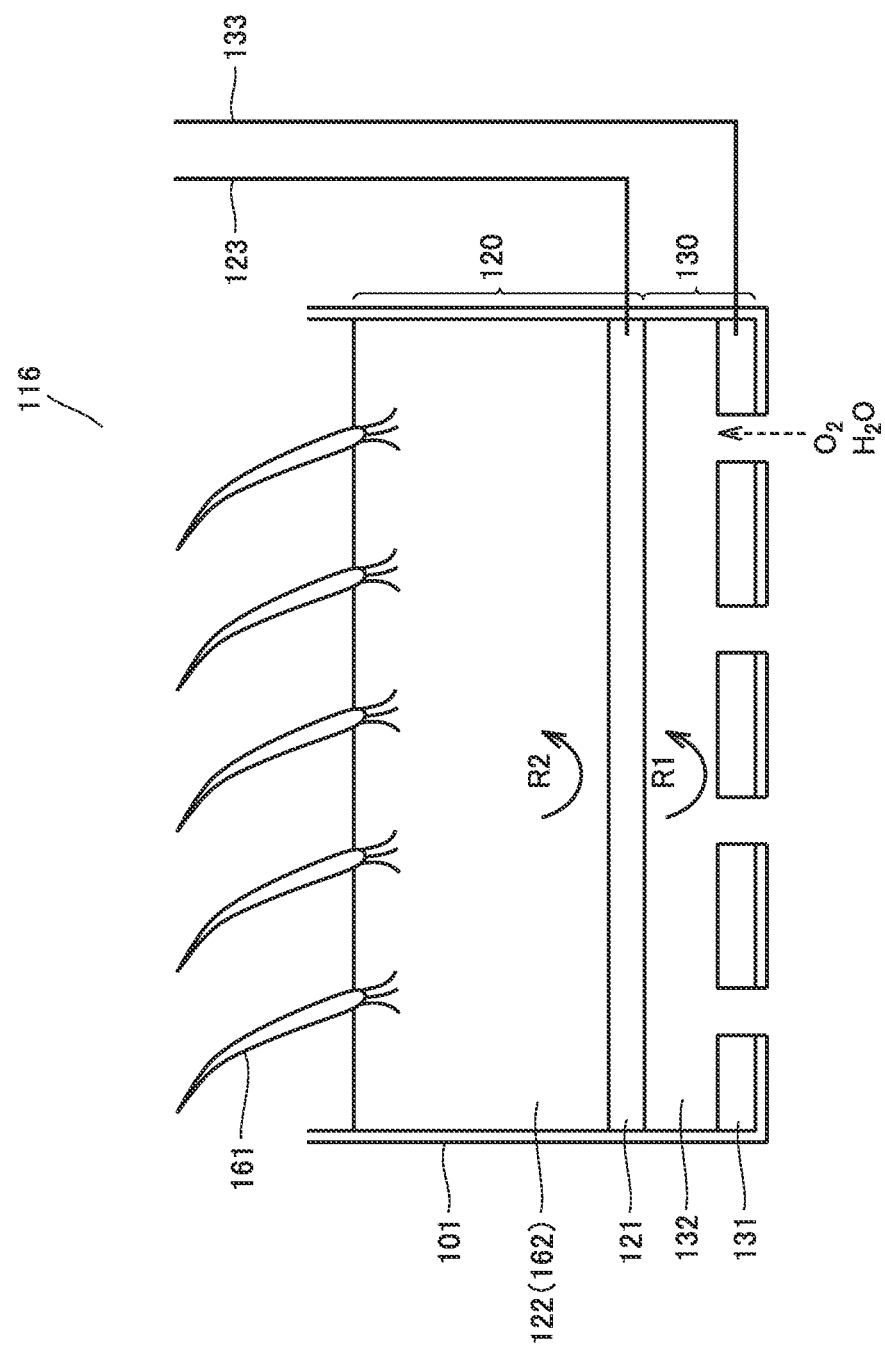
FIG. 18 is a sectional view schematically showing a configuration of a microbial fuel cell 116 of Embodiment 7 of the second aspect of the invention.

FIG. 18 is a sectional view schematically showing a configuration of a microbial fuel cell 116 of Embodiment 7 of the second aspect of the invention. Microbial fuel cell 116 shown in FIG. 18 has casing 101 having an opening on the upside, and is provided with positive electrode part 130 and negative electrode part 120 from the downside of casing 101. Negative electrode-side soil layer 122 in negative electrode part 120 functions as a greening base layer capable of growing plant 161 in an upper external environment. Negative electrode part 120 and positive electrode part 130 are provided in contact with each other so that ions can migrate between these parts. Between negative electrode part 120 and positive electrode part 130, an ion conductive membrane as is provided in microbial fuel cell 112 of Embodiment 2 of the second aspect of the invention may be provided. By providing the ion conductive membrane, it is possible to increase the amount of power generation. When the ion conductive membrane is used, positive electrode-side soil layer 132 can be omitted.

Microbial fuel cell 116 of Embodiment 7 of the second aspect of the invention is different from the configuration of microbial fuel cell 111 of Embodiment 1 of the second aspect of the invention in that a plurality of through-holes are provided in a bottom face of casing 101, positive electrode 131 is disposed on the bottom face, and greening base layer 162 is negative electrode-side soil layer 122.

(Use and Effect)

In microbial fuel cell 116 of Embodiment 7 of the second aspect of the invention, electromotive force is generated between negative electrode wiring 123 and positive electrode wiring 133 by reaction R1 and reaction R2 described above. The electromotive force generated by microbial fuel cell 116 of Embodiment 7 of the second aspect of the invention can be used as a power source for actuating an electric device.

In microbial fuel cell 116 of Embodiment 7 of the second aspect of the invention, since positive electrode 131 is not disposed on greening base layer 162, maintenance of greening base layer 162 can be easily conducted irrespectively of the integrated structure. Also in the case of conducting maintenance of greening base layer 162, since it is not necessary to disassemble positive electrode 131 and negative electrode 121, stable power generation is enabled before and after the maintenance. Further, since the bottom face of casing 101 is provided with a plurality of through-holes, it is possible to discharge excessive water supplied to the plant.

Since microbial fuel cell 116 of Embodiment 7 of the second aspect of the invention can be made to have a structure resembling a common flowerpot, it is possible to illuminate LED, and conduct sensing of the plant or the soil by using the power generated by the microbial fuel cell, and to provide a flowerpot capable of driving an automated water supply system as represented by the system of Embodiment 6 of the second aspect of the invention.

<Embodiment 8 of the Second Aspect of the Invention>

Figure 19:
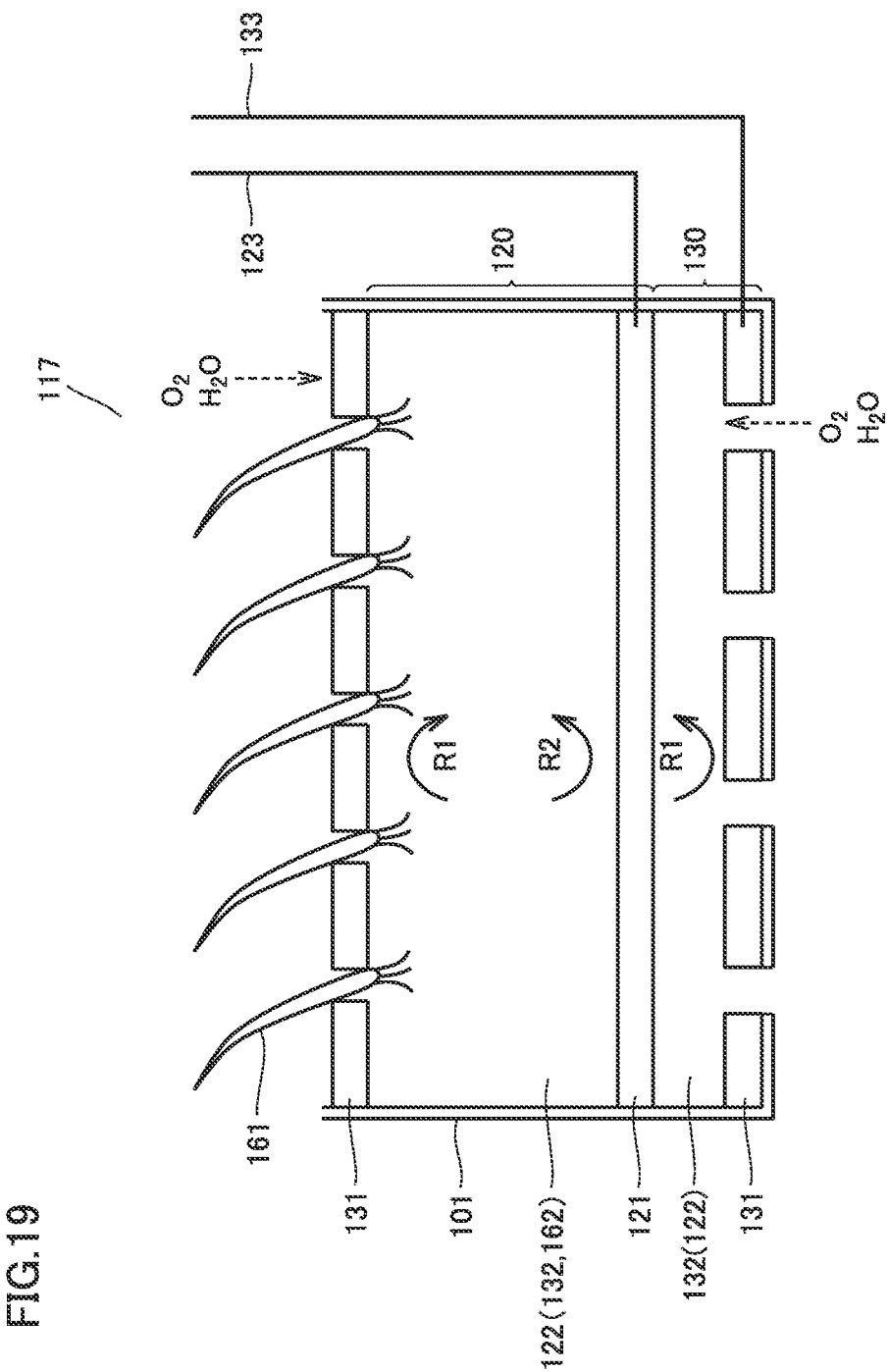
FIG. 19 is a sectional view schematically showing a configuration of a microbial fuel cell 117 of Embodiment 8 of the second aspect of the invention.

FIG. 19 is a sectional view schematically showing a configuration of a microbial fuel cell 117 of Embodiment 8 of the second aspect of the invention. Microbial fuel cell 117 shown in FIG. 19 has casing 101 having an opening on the upside, and is provided with positive electrode 131, positive electrode-side soil layer 132 serving also as negative electrode-side soil layer 122, negative electrode 121, negative electrode-side soil layer 122 serving also as positive electrode-side soil layer 132, and positive electrode 131 from the downside of casing 101. Negative electrode-side soil layer 122 functions as greening base layer 162 capable of growing plant 161 in an upper external environment. Here, greening base layer 162 may be independently provided on positive electrode 131 as shown in microbial fuel cell 113 of Embodiment 3 of the second aspect of the invention, or positive electrode 131 itself may serve as a greening base layer as shown in microbial fuel cell 114 of Embodiment 4 of the second aspect of the invention. Negative electrode part 120 and positive electrode part 130 are provided in contact with each other so that ions can migrate between these parts. Between negative electrode part 120 and positive electrode part 130, an ion conductive membrane as is provided in microbial fuel cell 112 of Embodiment 2 of the second aspect of the invention may be provided. By providing the ion conductive membrane, it is possible to increase the amount of power generation.

Microbial fuel cell 117 of Embodiment 8 of the second aspect of the invention is different from the configuration of microbial fuel cell 116 of Embodiment 7 of the second aspect of the invention in that positive electrode 131 is disposed also on the top face.

(Use and Effect)

In microbial fuel cell 117 of Embodiment 8 of the second aspect of the invention, electromotive force is generated between negative electrode wiring 123 and positive electrode wiring 133 by reaction R1 and reaction R2 described above. The electromotive force generated by microbial fuel cell 117 of Embodiment 8 of the second aspect of the invention can be used as a power source for actuating an electric device.

In microbial fuel cell 117 of Embodiment 8 of the second aspect of the invention, since positive electrode 131 is disposed on the bottom face and the top face of the casing, it is possible to increase the electrode area of the positive electrode, and to increase the amount of power generation of the microbial fuel cell. Further, since the bottom face of casing 101 is provided with a plurality of through-holes, it is possible to discharge excessive water supplied to the plant.

Since microbial fuel cell 117 of Embodiment 8 of the second aspect of the invention can be made to have a structure resembling a common flowerpot, it is possible to illuminate LED, and conduct sensing of the plant or the soil by using the power generated by the microbial fuel cell, and to provide a flowerpot capable of driving an automated water supply system as represented by the system of Embodiment 6 of the second aspect of the invention.

The present invention also provides a microbial fuel cell including a first cylindrical retainer having a first opening at least partly; a negative electrode disposed at least on an outer surface of the first cylindrical retainer; and a positive electrode disposed inside the first cylindrical retainer, wherein the negative electrode and the positive electrode are connected with each other via the first opening and an ion conductor, and anaerobic current-generating bacteria colonize at least on a negative electrode surface (hereinafter, the microbial fuel cell is referred to as a "third aspect of the invention").

Conventionally, microbial fuel cells utilizing the action of anaerobic current-generating bacteria are known. In such a microbial fuel cell, electrons generated in the course of decomposition of organic matters by the current-generating bacteria are collected on the negative electrode side, $H^+$ ions (protons) generated during the decomposition migrate to the positive electrode side, and the positive electrode reacts with oxygen to generate power. As a document disclosing such a microbial fuel cell, for example, Japanese Patent Laying-Open No. 2013-84541 (PTD 2) discloses a microbial fuel cell that includes a cylindrical retainer that is provided with a negative electrode and a positive electrode, and that generates electromotive force by being installed so that the negative electrode is disposed in a mud layer, and the positive electrode is disposed in a water layer. Japanese Patent Laying-Open No. 2011-65875 (PTD 3) discloses a microbial fuel cell that includes a casing including a plurality of cylindrical positive electrode members, wherein each of the cylindrical positive electrode members is circumferentially coated with an ion conductive membrane, and the coated positive electrode members are coated with a negative electrode member in the casing.

However, by the above-described techniques disclosed in PTDs 2 and 3, it is not possible to provide a microbial fuel cell that can be easily installed only by being planted in soil or mud containing anaerobic current-generating bacteria and can obtain electromotive force almost permanently from a natural ecosystem. To be more specific, the microbial fuel cell disclosed in PTD 2 has such a structure that requires an installation step for disposing the negative electrode and the positive electrode respectively at desired positions. In other words, it is necessary to adjust the amount of embedment of the cylindrical retainer, and the microbial fuel cell cannot be easily installed. In the microbial fuel cell disclosed in PTD 3, the action of the microorganism has duration of life because the inside of the casing is a closed space, and thus it is necessary to circulate a liquid containing organic matters in the casing through the negative electrode member. Therefore, in the environment where no circulation means is available, it is difficult to obtain electromotive force almost permanently from a natural ecosystem.

In light of the aforementioned problem, the present invention also provides a microbial fuel cell that can be easily configured only by embedding a cylindrical retainer in soil or mud where anaerobic current-generating bacteria are present and is open to a natural ecosystem (metabolism of current-generating bacteria and replacement thereof), and is capable of generating electromotive force almost permanently. That is, the present invention also provides the following microbial fuel cells.

(a) A microbial fuel cell including a first cylindrical retainer having a first opening at least partly; a negative electrode disposed at least on an outer surface of the first cylindrical retainer; and a positive electrode disposed inside the first cylindrical retainer, wherein the negative electrode and the positive electrode are connected with each other via the first opening and an ion conductor, and anaerobic current-generating bacteria colonize at least on a negative electrode surface (hereinafter, the microbial fuel cell is referred to as a "third aspect of the invention").

(b) In the microbial fuel cell of the third aspect of the invention, the negative electrode and the positive electrode at least partly face each other.

(c) The microbial fuel cell of the third aspect of the invention further includes a second cylindrical retainer having a second opening at least partly, inside the first cylindrical retainer, an inside of the second cylindrical retainer is exposed to a medium containing oxygen, and the positive electrode is disposed on at least either one selected from an outer surface and an inner surface of the second cylindrical retainer.

(d) In the microbial fuel cell of the third aspect of the invention, at least one tip end of the first cylindrical retainer has a sharp shape.

(e) In the microbial fuel cell of the third aspect of the invention, at least part of the first cylindrical retainer is flexible or curved.

With the microbial fuel cell of the third aspect of the invention, it is possible to provide a microbial fuel cell that can be easily configured only by embedding a cylindrical retainer in soil or mud where anaerobic current-generating bacteria are present.

<Embodiment 1 of the Third Aspect of the Invention>

Figure 20:
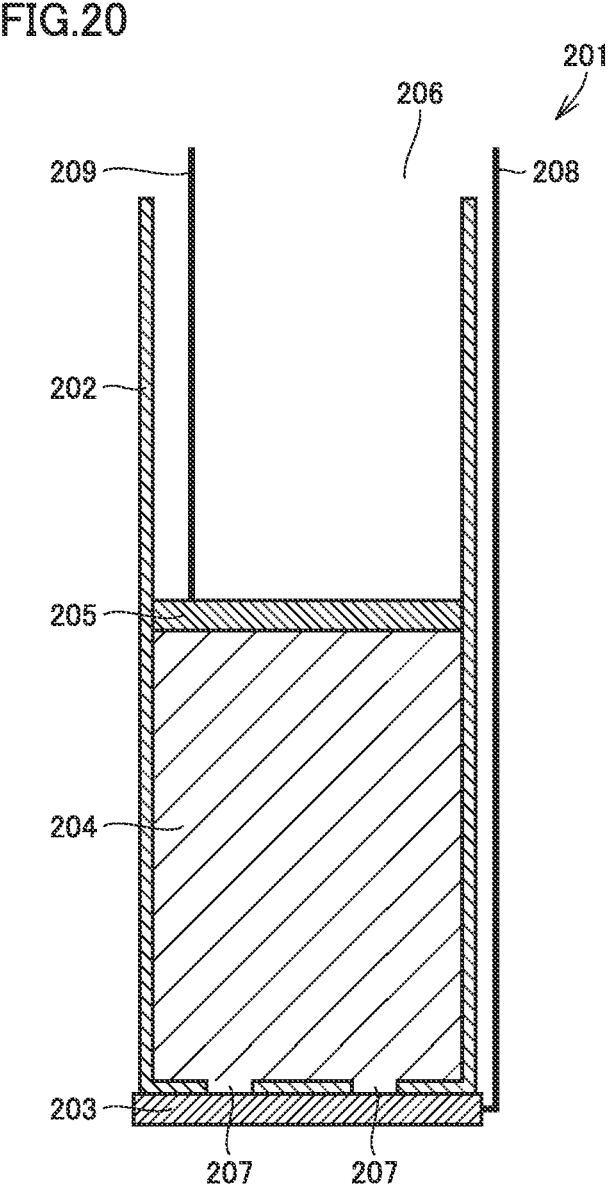
FIG. 20 is a sectional view schematically showing a microbial fuel cell 201 of Embodiment 1 of a third aspect of the invention.
Figure 21:
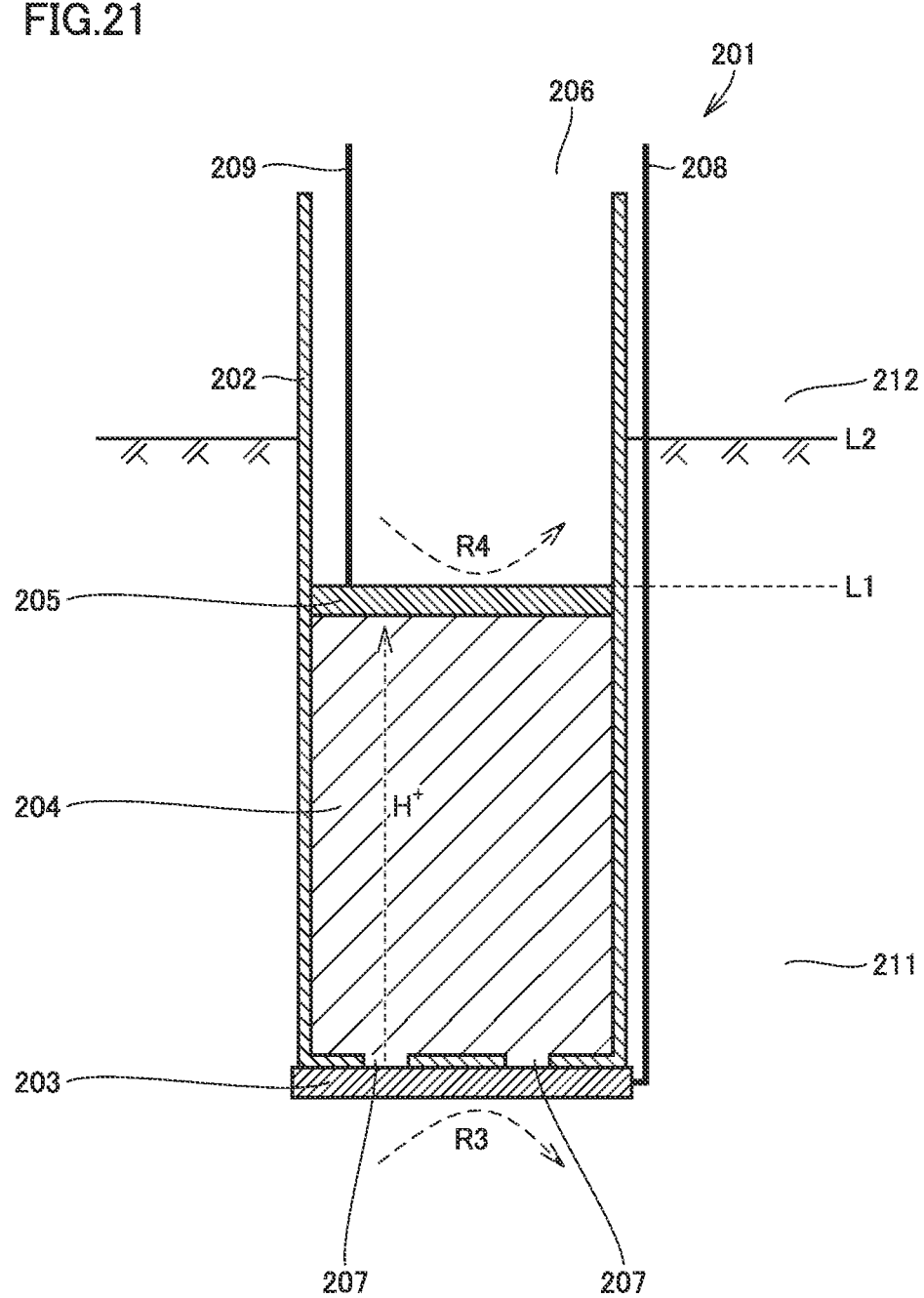
FIG. 21 schematically shows a principle of operation of microbial fuel cell 201 shown in FIG. 20.

FIG. 20 is a sectional view schematically showing a microbial fuel cell 201 of Embodiment 1 of the third aspect of the invention, and FIG. 21 schematically shows a principle of operation of microbial fuel cell 201 shown in FIG.

20. Hereinafter, referring to FIGS. 20 and 21, microbial fuel cell 201 of Embodiment 1 of the third aspect of the invention will be described.

Microbial fuel cell 201 of the example shown in FIG. 20 includes a first cylindrical retainer 202 having a first opening at least partly, and a negative electrode 203 disposed on an outer surface of first cylindrical retainer 202, wherein first cylindrical retainer 202 sealed on its bottom side with negative electrode 203 is filled with an ion conductor 204, and a positive electrode 205 is disposed thereon in contact with ion conductor 204. In the example shown in FIG. 20, first cylindrical retainer 202 has first openings 206, 207 respectively in its upper part and in part of the bottom face. In the example shown in FIG. 20, negative electrode 203 is disposed on the outer surface which serves as the bottom face of first cylindrical retainer 202.

In microbial fuel cell 201 of the third aspect of the invention, positive electrode 205 and negative electrode 203 are connected (ionic connection) with first opening (in the example shown in FIG. 20, a first opening 207 disposed in the outer surface which serves as the bottom face of first cylindrical retainer 202) via ion conductor 204 interposed therebetween. Here, "ionic connection" refers to that positive electrode 205 and negative electrode 203 are so configured that ions can migrate therebetween, and can be realized by the case where positive electrode 205 and negative electrode 203 are in contact with a common membrane-like ion conductor (ion conductive membrane) 204 as in the example shown in FIG. 20, for example, and also by the case where positive electrode 205 and negative electrode 203 are in contact with a common aqueous solution, the case where positive electrode 205 and negative electrode 203 are in contact with a common hydrogel, and the case where positive electrode 205 and negative electrode 203 are in contact with a common molten salt. Further, for conveniently adjusting the ion conductivity and oxygen permeability, ion conductor 204 may be formed of a laminate of multiple layers of different materials, and in this case, positive electrode 205 and negative electrode 203 are not necessarily required to be in contact with a common material of the same kind. Thus, ion conductor 204 in the third aspect of the invention contains an ion conductive membrane, an electrolyte solution/gel and the like.

In microbial fuel cell 201 of the third aspect of the invention, as a material for positive electrode 205 and negative electrode 203, those conventionally used in the present field can be appropriately used without any particular limitation. A carbon material having high corrosion resistance is desirable, and for example, carbon felt can be used. A metal base coated with carbon may also be used. As the metal base, those formed of SUS and having a mesh form with large surface area are desirably used. As a method for carbon coating, carbon plating with a molten salt, nonwoven fabric spraying, carbon-containing coating, sputtering and the like can be used.

Also a method of improving the efficiency by using an enzyme or a microorganism as an electrode catalyst is conventionally known, and positive electrode 205 and/or negative electrode 203 formed of the aforementioned material may be coated with a medium containing an enzyme or a microorganism. In this case, it is desired that positive electrode 205 and/or negative electrode 203 is individually in contact with the aforementioned ion conductor via the coating layer.

In microbial fuel cell 201 of the third aspect of the invention, anaerobic current-generating bacteria colonize on the surface of negative electrode 203. As current-generating bacteria, conventionally known appropriate anaerobic current-generating bacteria, such as *Shewanella* bacteria, Geobacter bacteria, *Rhodoferax ferrireducens*, and *Desulfobulbus propionicus* can be recited. Among these, *Shewanella* bacteria are preferred because they are abundantly contained in diverse soil, and can easily give and receive electrons with an anode electrode.

In microbial fuel cell 201 of the example shown in FIG. 20, to negative electrode 203 and positive electrode 205, negative electrode wiring 208 and positive electrode wiring 209 are respectively electrically connected. As a material of negative electrode wiring 208 and positive electrode wiring 209, SUS having high corrosion resistance or the like is desirable, and a material coated with an insulating resin or the like is desirable.

First cylindrical retainer 202 in microbial fuel cell 201 of the third aspect of the invention is preferably an insulator or an insulation-treated material for preventing electrification at least between negative electrode 203 and positive electrode 205, and as a preferred material for forming such a first cylindrical retainer, for example, general resin (or rubber) materials, fluororesin (or rubber) materials, metal materials with insulation coating, ceramic materials and the like can be recited. Among these, first cylindrical retainer 202 formed of a fluororesin (or rubber) material is preferably used for the reason of low cost and high corrosion resistance.

Here, FIGS. 22(a) to 22(c) schematically show various sectional shapes in the direction perpendicular to the longitudinal direction of the first cylindrical retainer in the microbial fuel cell. Specifically, FIG. 22(a) shows a circular shape, FIG. 22(b) shows a polygonal shape (a quadrangle in the example of FIG. 22(b)), and FIG. 22(c) shows a star shape. In this manner, as the first cylindrical retainer in the third aspect of the invention, those having various sectional shapes can be used depending on the use. In particular, by employing the star shape shown in FIG. 22(c), it is possible to increase the surface area of the first cylindrical retainer for the same sectional area, and thus it is possible to increase the surface area of the negative electrode when the negative electrode is provided along the first cylindrical retainer. This is the effect commonly exerted in microbial fuel cells of the third aspect of the invention including a cylindrical retainer.

Ion conductor 204 in microbial fuel cell 201 of the third aspect of the invention is, for example, a membrane-like member having ion conductivity (ion conductive membrane), and can be formed, for example, by mixing a salt such as potassium chloride or sodium chloride into agar-agar. For ion conductor 204, Nafion (registered trade name) available from Du Pont or the like can be used.

FIG. 21 shows the state where microbial fuel cell 201 shown in FIG. 20 is embedded in a soil layer 211. Soil layer 211 is desirably soil abundantly containing anaerobic current-generating bacteria, and is desirably leaf mold. Soil layer 211 may be in a so-called mud state having a high water content. As the anaerobic current-generating bacteria contained in soil layer 211, for example, *Shewanella* bacteria as described above are known. A high oxygen layer 212 that forms a border with soil layer 211 is, for example, air, but may be water containing air abundantly.

As shown in FIG. 21, on the side of negative electrode 203, reaction R3 occurs by metabolism of current-generating bacteria (decomposition of organic compounds). As the organic compounds, for example, glucose, acetic acid, and lactic acid are recited. Protons generated in reaction R3 pass through the first opening (first opening 207 provided in the outer surface which serves as the bottom face of first cylindrical retainer 202) and migrate inside ion conductor 204 toward positive electrode 205. In positive electrode 205, reaction R4 also occurs using oxygen of high oxygen layer 212. Reactions R3 and R4 are shown below.

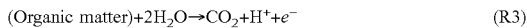
(Organic matter)+2H$_2$O→CO$_2$+H$^+$+e$^-$ (R3)

O$_2$+4H$^+$+4e$^-$→2H$_2$O (R4)

By the above reaction cycle, electromotive force is generated between negative electrode wiring 208 and positive electrode wiring 209.

In the third aspect of the invention, it is possible to obtain electromotive force by embedding at least negative electrode 203 below surface L2 of soil layer 211. Since positive electrode 205 is supplied with oxygen from above via opening 206 provided in an upper part of first cylindrical retainer 202, surface L1 of positive electrode 205 may be positioned below surface L2 of soil layer 211. That is, in the microbial fuel cell of the third aspect of the invention, there is no need to adjust the embedding amount, and the microbial fuel cell can be easily installed. Although it is desired to embed negative electrode 203 as deeply as possible for the purpose of activating metabolism of the anaerobic current-generating bacteria, according to the present configuration, it is possible to supply positive electrode 205 with oxygen irrespectively of the embedding depth.

In the microbial fuel cell of the third aspect of the invention, since negative electrode 203 is provided on the outer surface of first cylindrical retainer 202, it faces soil layer 211 without limitation, and anaerobic current-generating bacteria contributing to power generation contained in soil layer 211 are replaced in a natural ecosystem, and can keep colonizing on the surface of negative electrode 203. Therefore, in microbial fuel cell 201 of the third aspect of the invention, it is possible to generate power almost permanently unless electrode materials and wiring materials deteriorate. For example, in mountainous regions where electric power is not supplied, use of microbial fuel cell 201 of the third aspect of the invention makes it possible to provide a power source for illumination, sensors and the like for a long term.

<Embodiment 2 of the Third Aspect of the Invention>

Figure 23:
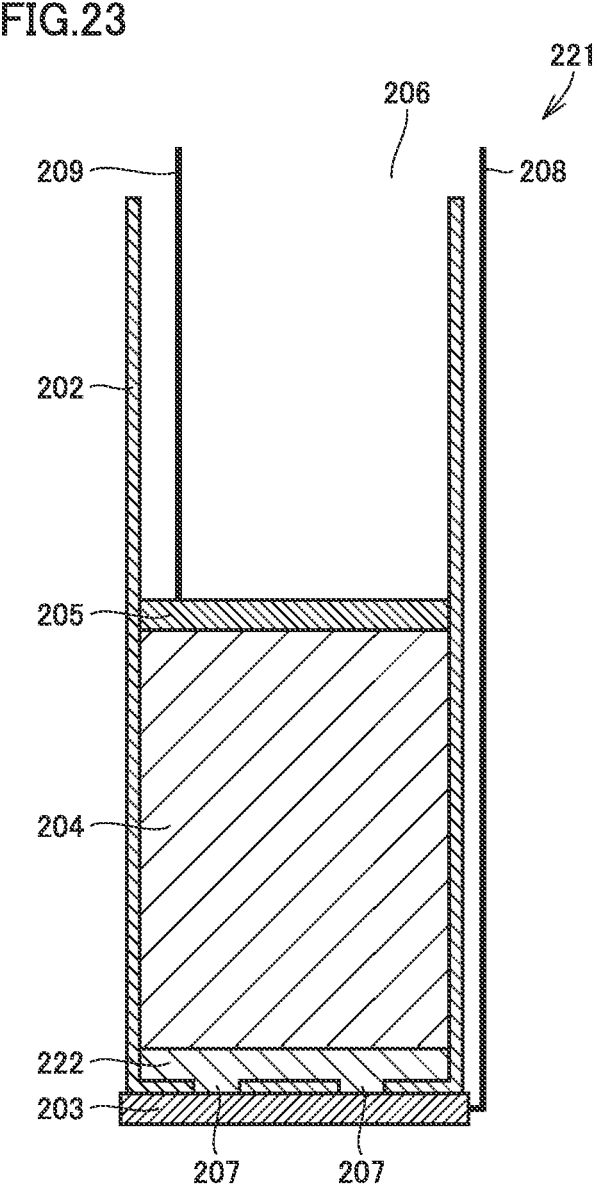
FIG. 23 is a sectional view schematically showing a microbial fuel cell 221 of Embodiment 2 of the third aspect of the invention.

FIG. 23 is a sectional view schematically showing a microbial fuel cell 221 of Embodiment 2 of the third aspect of the invention. Microbial fuel cell 221 shown in FIG. 23 has the same configuration as that of microbial fuel cell 201 of the example shown in FIG. 20 except for some parts, and the part having the same configuration is denoted by the same reference numeral, and the description thereof will be omitted. Microbial fuel cell 221 shown in FIG. 23 is different from microbial fuel cell 201 of the example shown in FIG. 20 in that a functional layer 222 is preliminarily enclosed between negative electrode 203 and ion conductor 204. As functional layer 222, for example, soil containing anaerobic current-generating bacteria or the like is preferably used. Having such functional layer 222 is advantageous in that the surface area contributing to power generation of negative electrode 203 can be increased. In this case, it is desired to configure negative electrode 203 to have a fine through-hole so that anaerobic current-generating bacteria can migrate between functional layer 222 and soil layer 211. Likewise, functional layer 222 may be provided between positive electrode 205 and ion conductor 204. In this case, for functional layer 222, for example, a medium containing enzymes and microorganisms can be preferably used, and as a result, the function of forcedly reducing oxygen can be added and the power generation efficiency can be improved. Likewise, functional layer 222 may be provided between positive electrode 205 and ion conductor 204. In this case, for functional layer 222, for example, a medium containing enzymes and microorganisms can be preferably used, and as a result, the function of forcedly reducing oxygen can be added and the power generation efficiency can be improved.

<Embodiment 3 of the Third Aspect of the Invention>

Figure 24:
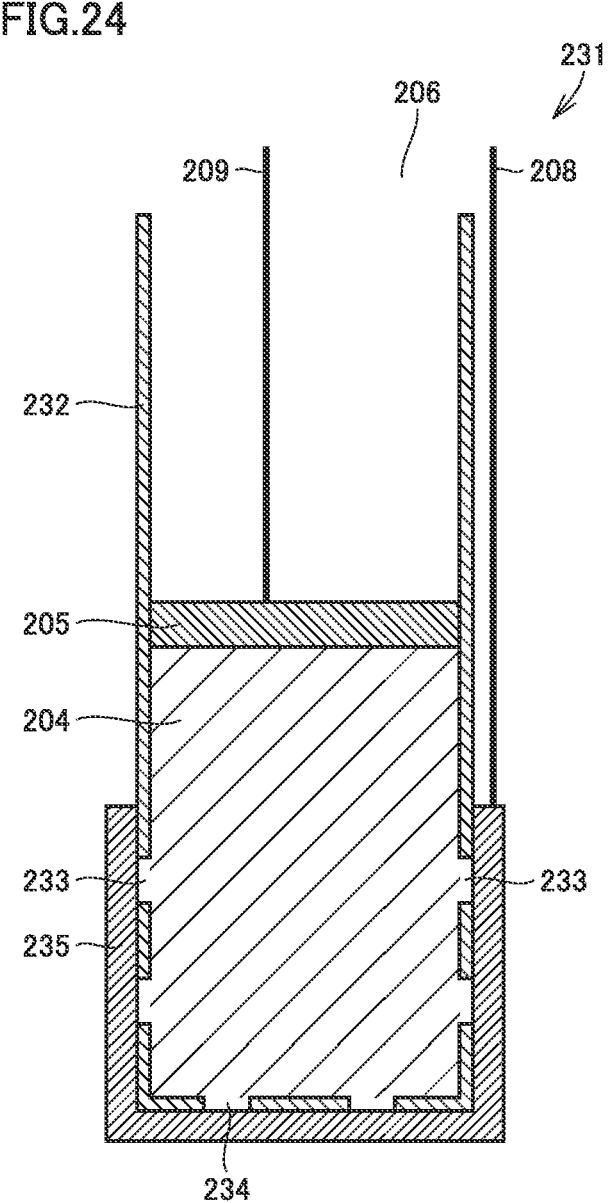
FIG. 24 is a sectional view schematically showing a microbial fuel cell 231 of Embodiment 3 of the third aspect of the invention.
Figure 25:
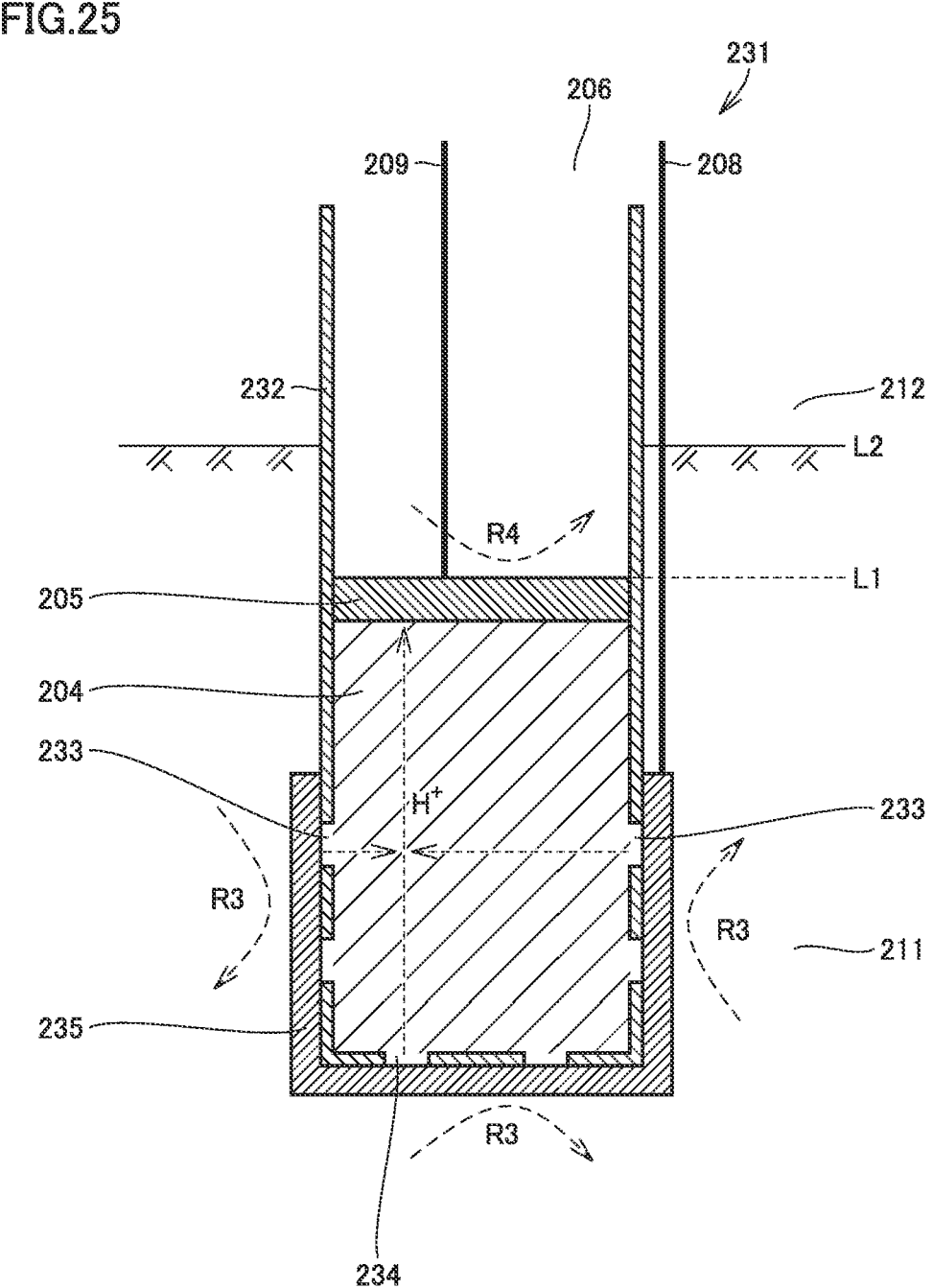
FIG. 25 schematically shows a principle of operation of microbial fuel cell 231 shown in FIG. 24.

FIG. 24 is a sectional view schematically showing a microbial fuel cell 231 of Embodiment 3 of the third aspect of the invention, and FIG. 25 schematically shows a principle of operation of microbial fuel cell 231 shown in FIG. 24. Hereinafter, referring to FIGS. 24 and 25, microbial fuel cell 231 of Embodiment 3 of the third aspect of the invention will be described. Microbial fuel cell 231 shown in FIGS. 24 and 25 has the same configuration as that of microbial fuel cell 201 of the example shown in FIGS. 20 and 21 except for some parts, and the part having the same configuration is denoted by the same reference numeral, and the description thereof will be omitted.

Microbial fuel cell 231 of the example shown in FIG. 24 is provided with first openings (in the example shown in FIG. 24, a plurality of first openings 233 provided on the lateral face, and a plurality of first openings 234 provided on the bottom face) respectively in part of the lateral face and bottom face of first cylindrical retainer 232, and a negative electrode 235 is provided in such a manner that it covers first openings 233, 234.

As shown in FIG. 25, by using microbial fuel cell 231 shown in FIG. 24, it is possible to increase the surface area of the bottom face and the lateral face of negative electrode 235, and the total amount of the anaerobic current-generating bacteria contained in soil layer 211 contacting negative electrode 235 increases, so that it becomes possible to collect a greater current in comparison with microbial fuel cell 201 shown in FIG. 20. Protons from negative electrode 235 pass through openings 233, 234 on the lateral face and the bottom face of first cylindrical retainer 232, and migrate to positive electrode 205 via ion conductor 204.

<Embodiment 4 of the Third Aspect of the Invention>

Figure 26:
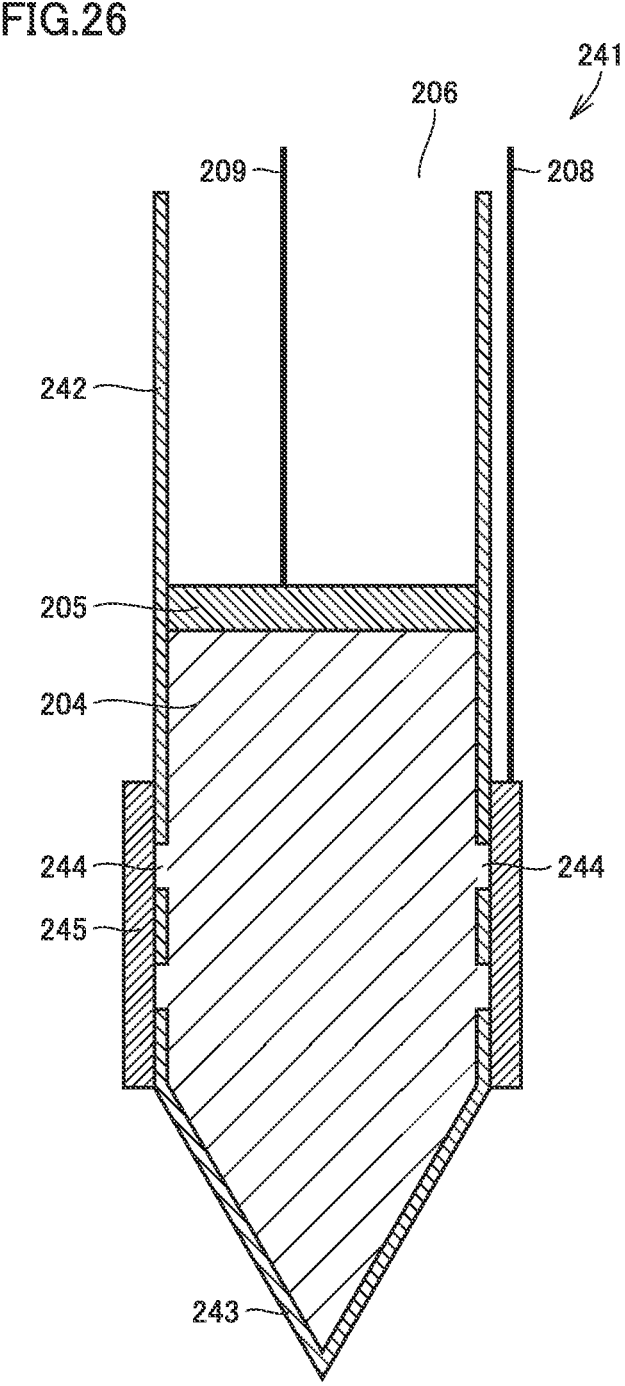
FIG. 26 is a sectional view schematically showing a microbial fuel cell 241 of Embodiment 4 of the third aspect of the invention.

FIG. 26 is a sectional view schematically showing a microbial fuel cell 241 of Embodiment 4 of the third aspect of the invention. Microbial fuel cell 241 shown in FIG. 26 has the same configuration as those of microbial fuel cells 201, 221, 231 of the examples respectively shown in FIGS. 20, 23 and 24 except for some parts, and the part having the same configuration is denoted by the same reference numeral, and the description thereof will be omitted. In the microbial fuel cell of the third aspect of the invention, at least one of tip ends of the first cylindrical retainer may have a sharp shape. FIG. 26 shows an example having a first cylindrical retainer 242 having a tip end part 243 with a sharp shape on its one side. This makes it possible to drive first cylindrical retainer 242 into soil layer 211 as if it were a pile, to further facilitate the installation and construction. In the example shown in FIG. 26, first cylindrical retainer 242 has a plurality of first openings 244 on the lateral face in the part other than tip end part 243, and these first openings 244 are covered with a negative electrode 245.

<Embodiment 5 of the Third Aspect of the Invention>

Figure 27:
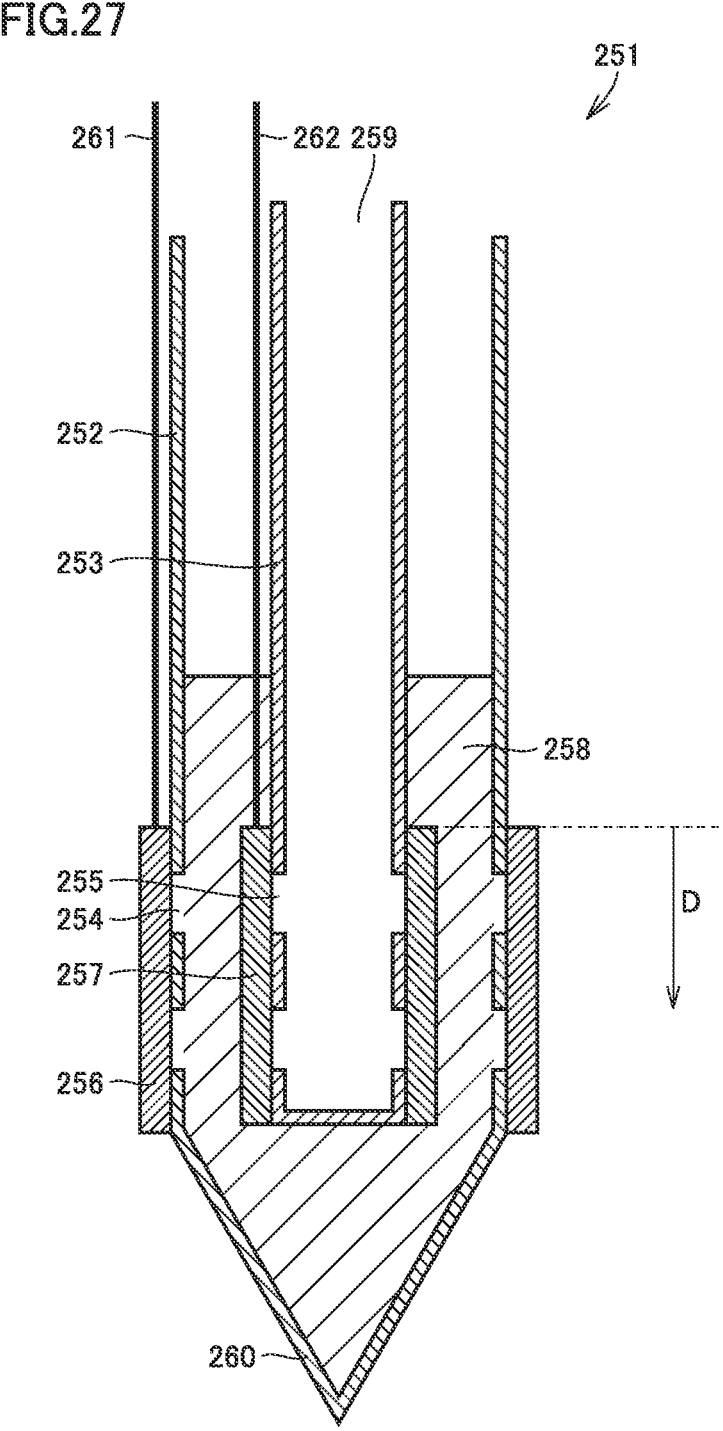
FIG. 27 is a sectional view schematically showing a microbial fuel cell 251 of Embodiment 5 of the third aspect of the invention.
Figure 28:
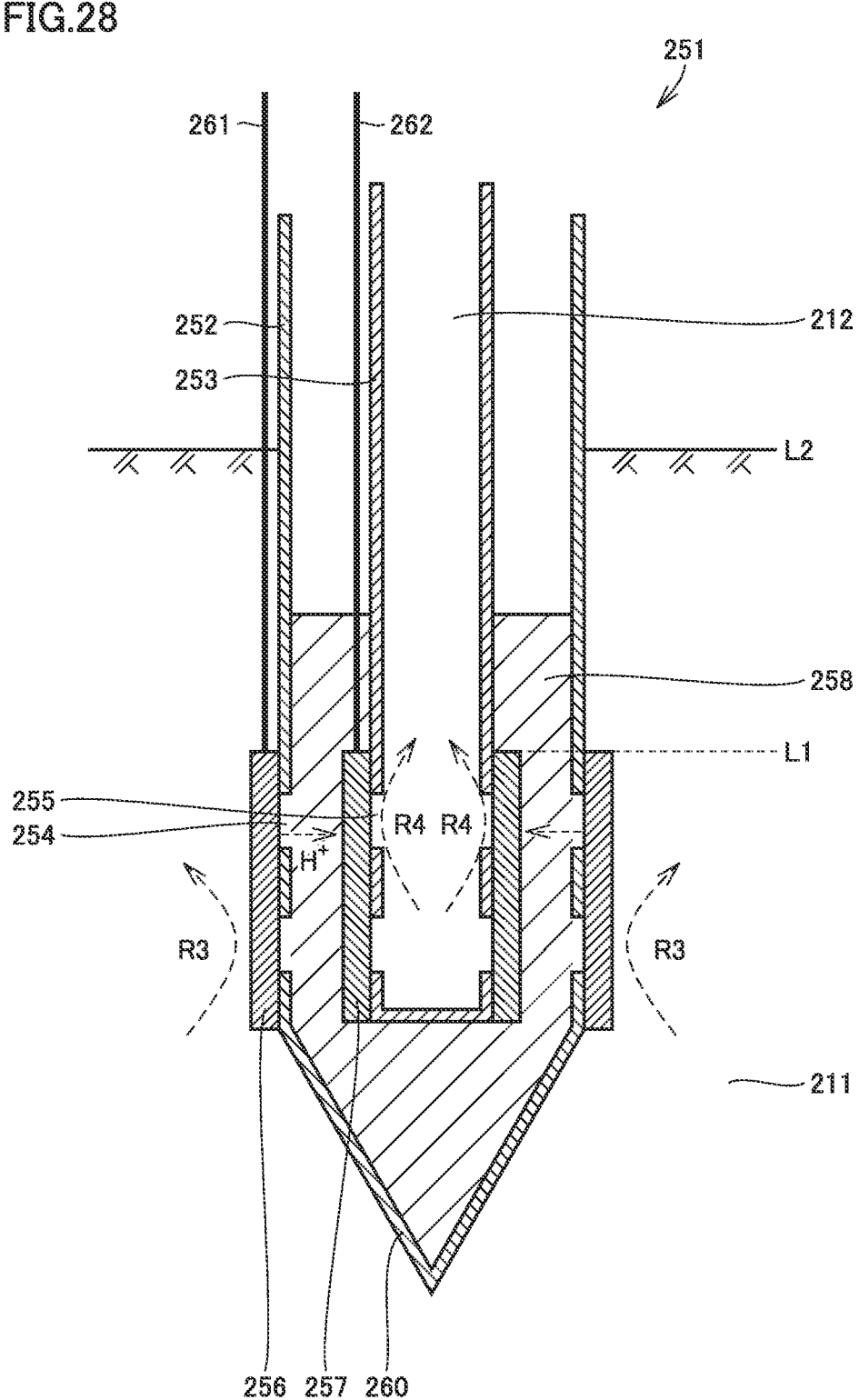
FIG. 28 schematically shows a principle of operation of microbial fuel cell 251 shown in FIG. 27.
Figure 29:
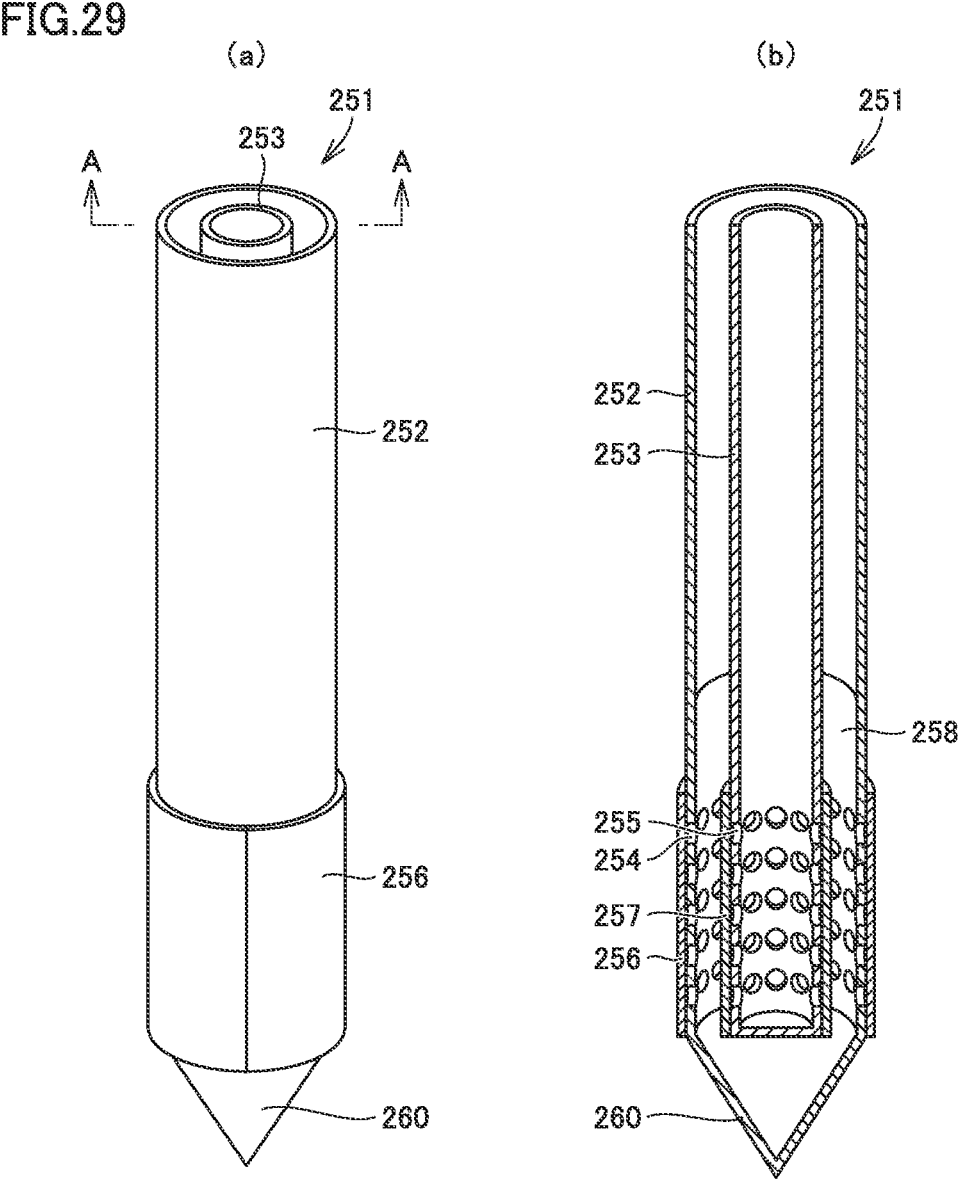
FIG. 29(a) is a perspective view of microbial fuel cell 251 shown in FIG. 27.
FIG. 29(b) is an exploded perspective view of microbial fuel cell 251 shown in FIG. 27.

Here, FIG. 27 is a sectional view schematically showing a microbial fuel cell 251 of Embodiment 5 of the third aspect of the invention, FIG. 28 schematically shows a principle of operation of microbial fuel cell 251 shown in FIG. 27, FIG. 29(a) is a perspective view of microbial fuel cell 251 shown in FIG. 27, and FIG. 29(b) is an exploded perspective view of the same. Hereinafter, referring to FIGS. 27 to 29, microbial fuel cell 251 of Embodiment 5 of the third aspect of the invention will be described. Microbial fuel cell 251 shown in FIGS. 27 to 29 has the same configuration as those of microbial fuel cells 201, 221, 231, 241 of the examples respectively shown in FIGS. 20, 21, and 23 to 26 except for some parts, and the part having the same configuration is denoted by the same reference numeral, and the description thereof will be omitted.

Microbial fuel cell 251 of the example shown in FIGS. 27 to 29(b) further includes, inside a first cylindrical retainer (outer cylinder) 252, a second cylindrical retainer (inner cylinder) 253 having a second opening at least partly. In the example shown in FIGS. 27 to 29(b), a plurality of first openings 254 are provided on the lateral face of first cylindrical retainer (outer cylinder) 252, and also a plurality of second openings 255 are provided on the lateral face of second cylindrical retainer (inner cylinder) 253. In microbial fuel cell 251 of the example shown in FIGS. 27 to 29(b), a negative electrode 256 is provided on the outer surface of first cylindrical retainer (outer cylinder) 252, and a positive electrode 257 is provided on the outer surface of second cylindrical retainer (inner cylinder) 253 (in other words, second cylindrical retainer (inner cylinder) 253 is covered with positive electrode 257).

Between first cylindrical retainer (outer cylinder) 252 and second cylindrical retainer (inner cylinder) 253, an ion conductor 258 is stored so that negative electrode 256 and positive electrode 257 can establish ionic connection via the first opening of first cylindrical retainer (outer cylinder) 252 and ion conductor 258. Second cylindrical retainer (inner cylinder) 253 also has a second opening 259 in its upper part so that the interior of second cylindrical retainer (inner cylinder) 253 is exposed to a medium containing oxygen (preferably air) via second opening 259. In the example shown in FIGS. 27 to 29, likewise microbial fuel cell 241 of the example shown in FIG. 26, first cylindrical retainer (outer cylinder) 252 has a tip end part 260 with a sharp shape on its one side. Likewise microbial fuel cells 201, 221, 231 241 of the examples respectively shown in FIGS. 20, 21, and 23 to 26, negative electrode wiring 261 and positive electrode wiring 262 are respectively electrically connected to negative electrode 256 and positive electrode 257.

FIG. 28 shows the state where microbial fuel cell 251 shown in FIGS. 27, 29(a), and 29(b) is embedded in soil layer 211. In FIG. 28, the outer surface of first cylindrical retainer (outer cylinder) 252 is exposed to soil layer 211, and the interior of second cylindrical retainer (inner cylinder) 253 is exposed to high oxygen layer (for example, air, as described above) 212. As a result, negative electrode 256 advances the aforementioned reaction R3 with soil layer 211, and positive electrode 257 advances the aforementioned reaction R4 with high oxygen layer 212 through second opening 255 from second cylindrical retainer (inner cylinder) 253.

In the case shown in FIG. 28, it is desired that negative electrode 256 is embedded as deeply as possible, however, it becomes possible to supply positive electrode 257 with oxygen irrespectively of the embedding depth. Further, it becomes possible to control the distance between neighboring negative electrode 256 and positive electrode 257 constantly, and bring them closer to each other, so that it is possible to improve the proton conducting efficiency. Ion conductor 258 also has a function of blocking oxygen supplied from the interior of second cylindrical retainer (inner cylinder) 253. An oxygen absorbent may further be added to ion conductor 258. The oxygen absorbent is, for example, organic substances such as an enzyme having oxygen reducing ability (concretely, glucose oxydase, lac- case, bilirubin oxidase and so on), and inorganic substances having oxygen adsorptivity (concretely, iron compounds and so on).

Positive electrode 257 reacts with oxygen in second cylindrical retainer (inner cylinder) 253 via second opening 255. Negative electrode 256 is positioned in the outermost surface, and when it is embedded in soil layer 211, it comes into direct contact with soil layer 211. Negative electrode 256 is ionically connected with positive electrode 257 via first opening 254 of first cylindrical retainer (outer cylinder) 252, and ion conductor 258. The shapes of first opening 254 and second opening 255 are not particularly limited, and as in the example shown in FIG. 29, they may be formed by arranging a plurality of circular holes, and may be naturally other forms such as a mesh-like form.

Negative electrode 256 and first opening 254, and/or positive electrode 257 and second opening 255 may be integrated. That is, an effect equivalent to the present configuration can be obtained by such a configuration or selection of an electrode material that ion conductor 258 contacting an electrode material is fixed inside first cylindrical retainer (outer cylinder) 252 so as to prevent it from entering inside second cylindrical retainer (inner cylinder) 253.

<Embodiment 6 of the Third Aspect of the Invention>

Figure 30:
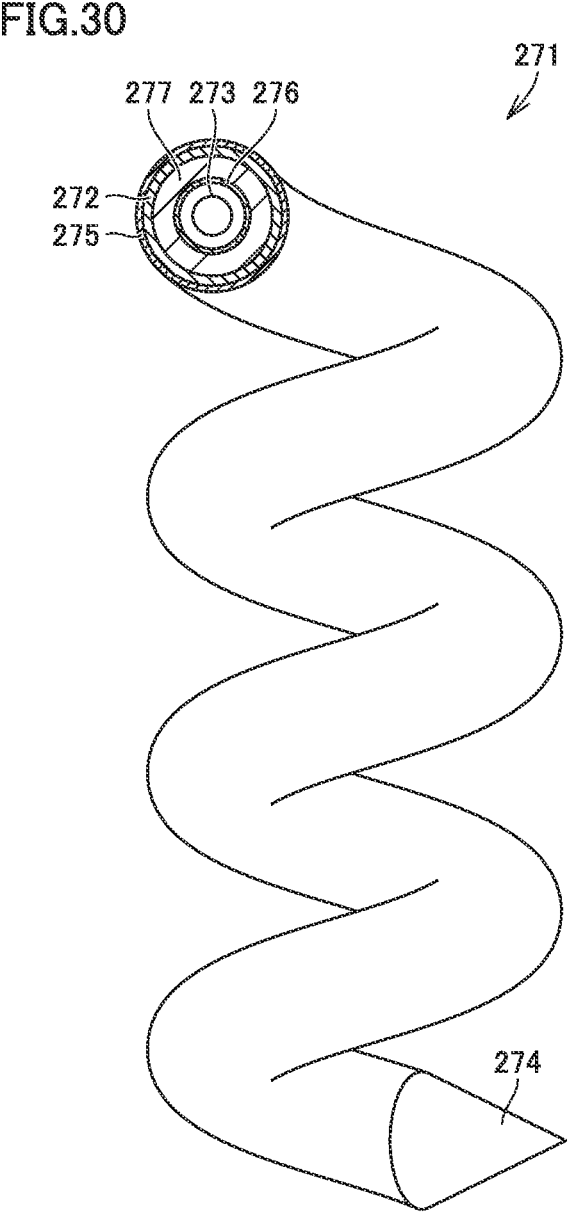
FIG. 30 is a perspective view schematically showing a microbial fuel cell 271 of Embodiment 6 of the third aspect of the invention.

FIG. 30 is a perspective view schematically showing a microbial fuel cell 271 of Embodiment 6 of the third aspect of the invention. FIG. 30 shows a partial section, and this section shows the part corresponding to region D in the configuration shown in FIG. 27. Microbial fuel cell 271 shown in FIG. 30 has the same configuration as those of microbial fuel cells 201, 221, 231, 241, 251 of the examples respectively shown in FIGS. 20, 21, and 23 to 29 except for some parts, and the part having the same configuration is denoted by the same reference numeral, and the description thereof will be omitted.

In microbial fuel cell 271 of the example shown in FIG. 30, a first cylindrical retainer (outer cylinder) 272 and a second cylindrical retainer (inner cylinder) 273 positioned inside first cylindrical retainer 272 each have a tubular shape, and are formed in a spiral form. The microbial fuel cell of the third aspect of the invention may be realized in such a manner that at least part of the first cylindrical retainer is flexible or curved. FIG. 30 shows the example in which the whole of the first cylindrical retainer and the second cylindrical retainer are flexible. Likewise the example in FIGS. 26 to 29, first cylindrical retainer 272 in microbial fuel cell 271 in the example shown in FIG. 30 has a tip end part 274 with a sharp shape on its one side.

Also in microbial fuel cell 271 of the example shown in FIG. 30, first cylindrical retainer (outer cylinder) 272 is covered with a negative electrode 275, and second cylindrical retainer (inner cylinder) 273 is covered with a positive electrode 276. Likewise the microbial fuel cell of the aforementioned embodiment, first cylindrical retainer (outer cylinder) 272 and second cylindrical retainer (inner cylinder) 273 are respectively provided with a first opening and a second opening (not illustrate), and negative electrode 275 and positive electrode 276 are ionically connected by an ion conductor 277 via the first opening of first cylindrical retainer (outer cylinder) 272.

In microbial fuel cell 271 shown in FIG. 30, since first cylindrical retainer (outer cylinder) 272 and second cylindrical retainer (inner cylinder) 273 are spiral tubes, it becomes possible to easily increase the electrode surface area that contributes to power generation per volume by increasing the length of the spiral part. When microbial fuel cell 271 is embedded in a soil layer, it can be easily turned and screwed deeply into a soil layer by using the present configuration. First cylindrical retainer (outer cylinder) 272 and second cylindrical retainer (inner cylinder) 273 which are spiral tubes may be made of a flexible material as in a rubber hose. In this case, they may have various shapes without limited to the spiral form, and the effect of increasing the electrode surface area contributing to power generation is obtained in the same manner as described above. Even when the depth of embedding in the ground is large, positive electrode 276 is capable of reacting with oxygen inside second cylindrical retainer (inner cylinder) 273, and thus the effect as a microbial fuel cell can be obtained irrespectively of the embedding depth.

Microbial fuel cell 271 as shown in FIG. 30 is intended to be used in a state of being embedded under the ground, and by effectively using the volume under the ground that does not appear on the surface, the amount of power generation is increased, and the part projecting on the ground can be reduced. As a result, the microbial fuel cell can be suitably used as a power source in unsunny mountainous regions where power generation by a conventional solar cell or the like is difficult, and it becomes possible to reduce the required area on the ground, and to provide a power source for illumination or devices such as various sensors. It is also possible to make the installation and construction very easy.

<Embodiment 7 of the Third Aspect of the Invention>

FIGS. 31(*a*) and 31(*b*) schematically show a microbial fuel cell 281 of Embodiment 7 of the third aspect of the invention. Specifically, FIG. 31(*a*) is a perspective view, and FIG. 31(*b*) is a sectional view. FIG. 31(*b*) shows a section taken along line B-B in FIG. 31(*a*), and this section shows the part corresponding to region D in the configuration shown in FIG. 27. Microbial fuel cell 281 shown in FIG. 31 has the same configuration as those of microbial fuel cells 201, 221, 231, 241, 251, 271 of the examples respectively shown in FIGS. 20, 21, and 23 to 30 except for some parts, and the part having the same configuration is denoted by the same reference numeral, and the description thereof will be omitted.

Microbial fuel cell 281 of the example shown in FIG. 31(*a*) has a screw-like outer shape. As shown in FIG. 31(*b*), a first cylindrical retainer (outer cylinder) 282 has a screw-like outer shape, and at least part of the outer surface is covered with a negative electrode 283. Inside first cylindrical retainer (outer cylinder) 282, a linear second cylindrical retainer (inner cylinder) 284 is provided, and the outer surface thereof is covered with a positive electrode 285. Likewise the microbial fuel cell having the aforementioned configuration, negative electrode 283 and positive electrode 284 are ionically connected by coming into contact, for example, with a common ion conductor 286 via a first opening (not illustrated) of the first cylindrical retainer (outer cylinder).

In the case of microbial fuel cell 281 shown in FIGS. 31(*a*) and 31(*b*), since first cylindrical retainer (outer cylinder) 282 has a screw-like outer shape, it becomes possible to easily turn and embed microbial fuel cell 281 in a hard ground surface. In addition, the increased surface area by employing the screw form makes it possible to increase the electrode surface area contributing to power generation. Therefore, it becomes possible to increase the amount of power generation per embedded volume.

Further, the second cylindrical retainer (inner cylinder) may also be in a screw form offset from the inner surface of first cylindrical retainer (outer cylinder) 282 by a desired distance. For example, second cylindrical retainer can be produced in the following manner after screw-like first cylindrical retainer (outer cylinder) 282 is filled with an ion conductor, a second cylindrical retainer (inner cylinder) having a screw-like outer shape is inserted with a spacer or the like interposed therebetween. In this case, as the ion conductor, materials that solidify or soften under certain conditions (for example, agar-agar, gelatin, agar and the like) are preferably used.

<Embodiment 8 of the Third Aspect of the Invention>

Figure 32:
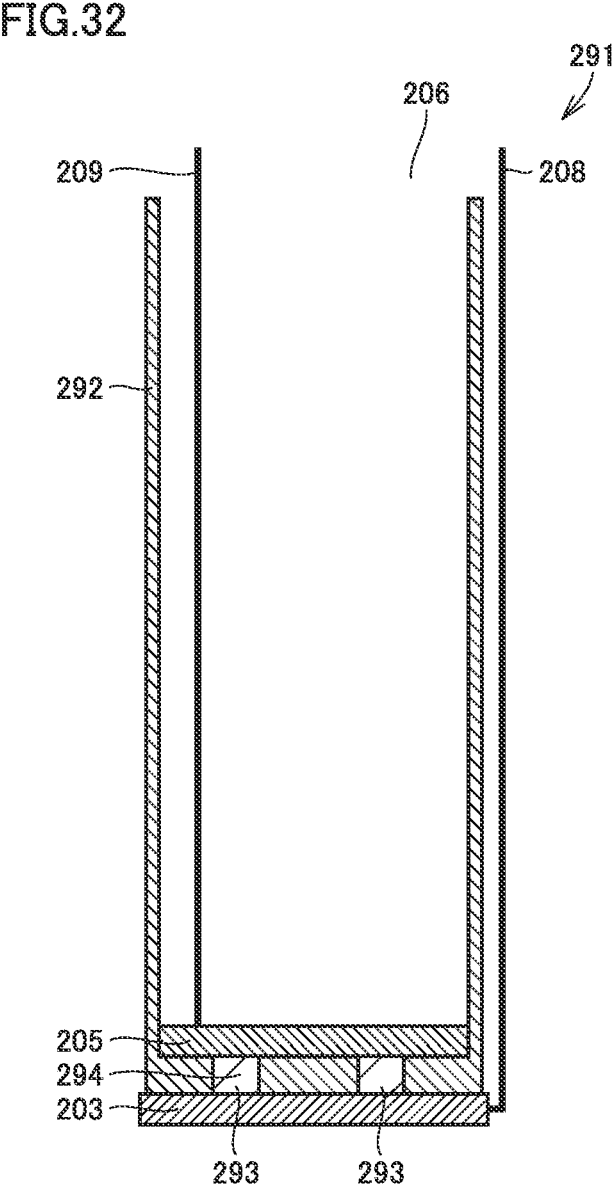
FIG. 32 is a sectional view schematically showing a microbial fuel cell 291 of Embodiment 8 of the third aspect of the invention.

FIG. 32 is a sectional view schematically showing a microbial fuel cell 291 of Embodiment 8 of the third aspect of the invention. Microbial fuel cell 291 shown in FIG. 32 has the same configuration as that of microbial fuel cell 201 of the example shown in FIG. 20 except for some parts, and the part having the same configuration is denoted by the same reference numeral, and the description thereof will be omitted.

Microbial fuel cell 291 of the example shown in FIG. 32 is so configured that positive electrode 205 and negative electrode 203 face each other and abut on the inner surface of a first cylindrical retainer 292. Also in the example shown in FIG. 32, first cylindrical retainer 292 is provided with a first opening 293 in the outer surface which serves as the bottom face of first cylindrical retainer 292, first opening 293 is filled with an ion conductor 294, and positive electrode 205 and negative electrode 203 are ionically connected via first opening 293 and ion conductor 294. Preferably, in the present invention, as in the example shown in FIG. 32, the positive electrode and the negative electrode face each other at least partly. Microbial fuel cell 291 shown in FIG. 32 is advantageous in that positive electrode 205 is fixed to first cylindrical retainer 292 stably, and the amount of ion conductor 294 can be minimized. Further, first cylindrical retainer 292 itself functions also as a spacer so that ion conductor 294 has a predetermined thickness.

<Embodiment 9 of the Third Aspect of the Invention>

Figure 33:
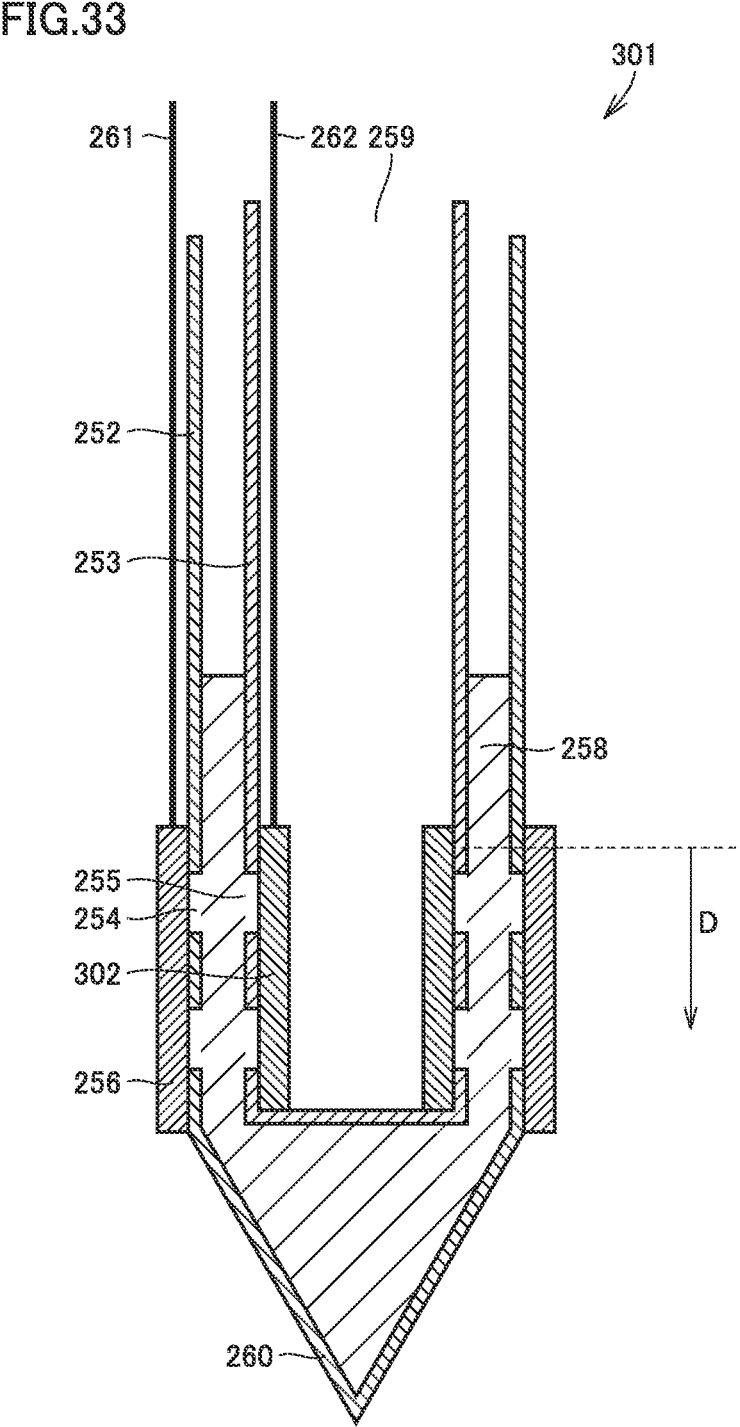
FIG. 33 is a sectional view schematically showing a microbial fuel cell 301 of Embodiment 9 of the third aspect of the invention.

FIG. 33 is a sectional view schematically showing a microbial fuel cell 301 of Embodiment 9 of the third aspect of the invention. Microbial fuel cell 301 shown in FIG. 33 has the same configuration as that of microbial fuel cell 251 of the example shown in FIG. 27 except for some parts, and the part having the same configuration is denoted by the same reference numeral, and the description thereof will be omitted.

Microbial fuel cell 301 of the example shown in FIG. 33 is the same as microbial fuel cell 251 of the example shown in FIG. 27 except that a positive electrode 302 is provided to abut on the inner surface of the second cylindrical retainer (inner cylinder). By employing such a configuration, it is possible to increase the area of the part of positive electrode 302 exposed to air, and advantageously it is possible to promote the reaction on the side of positive electrode 302.

<Embodiment 10 of the Third Aspect of the Invention>

Figure 34:
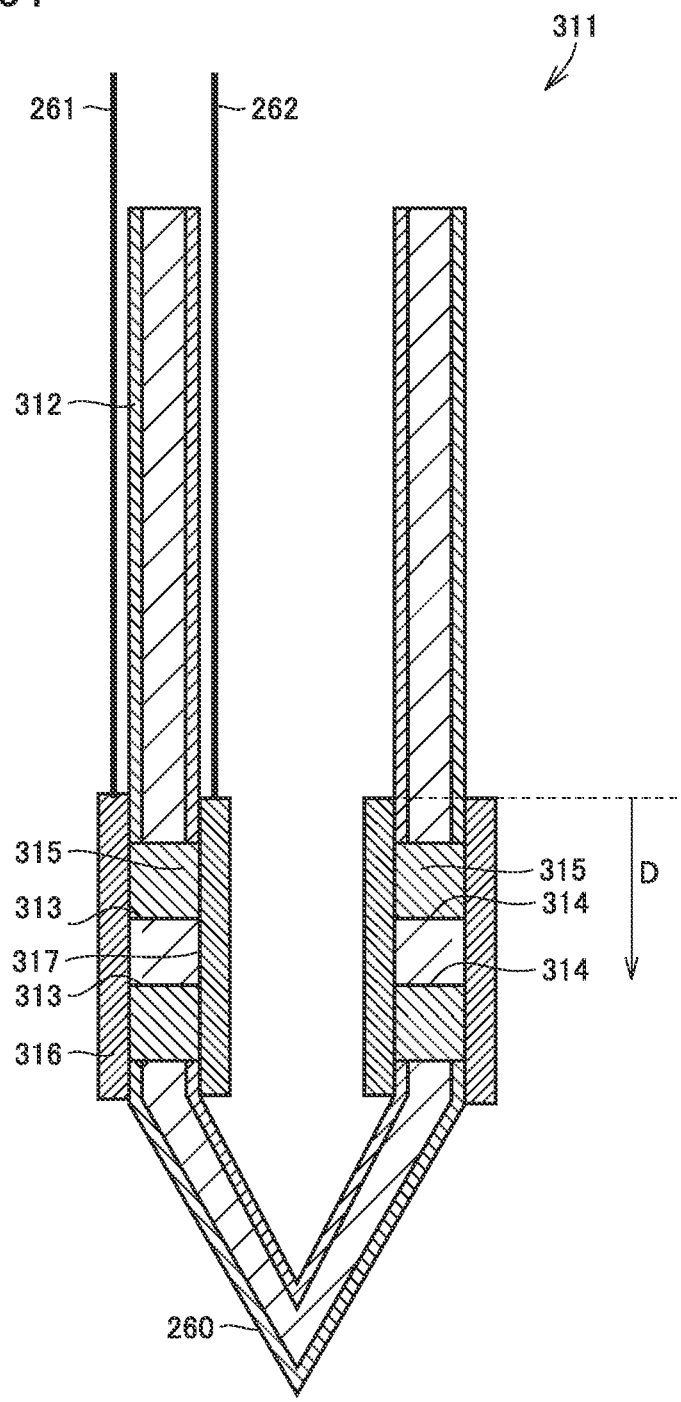
FIG. 34 is a sectional view schematically showing a microbial fuel cell 311 of Embodiment 10 of the third aspect of the invention.

FIG. 34 is a sectional view schematically showing a microbial fuel cell 311 of Embodiment 10 of the third aspect of the invention. Microbial fuel cell 311 shown in FIG. 34 has the same configuration as those of microbial fuel cells 201, 221, 231, 241, 251, 271, 281, 291, 301 of the examples respectively shown in FIGS. 20, 21, and 23 to 33 except for some parts, and the part having the same configuration is denoted by the same reference numeral, and the description thereof will be omitted.

In microbial fuel cell 311 of the example shown in FIG. 34, a first cylindrical retainer 312 similar to the first cylindrical retainer shown in FIG. 26 is used, first openings 313, 314 that penetrate the inner surface side and the outer surface side of first cylindrical retainer 312 are provided, first openings 313, 314 are filled with an ion conductor 315, and a negative electrode 316 provided in abutment with the outer surface of first cylindrical retainer 312, and a positive electrode 317 provided in abutment with the inner surface of first cylindrical retainer 312 face each other with first openings 313, 314 and ion conductor 315 interposed therebetween, and are ionically connected. This gives the advantage that the number of parts constituting the microbial fuel cell can be reduced, and the amount of ion conductor 315 can be minimized. Further, first cylindrical retainer 312 itself functions also as a spacer so that ion conductor 315 has a predetermined thickness.

Hereinafter, the present invention will be described more specifically with reference to examples, however, the present invention is not limited in any way by these examples.

EXAMPLE 1

Circular carbon felt (5-mm thick) (available from Alfa Aesar) having a diameter of 90 mm was prepared as anode electrode 2 and cathode electrode 3, and stainless wires as lead wires 8, 9 were interwoven into carbon felt prepared as anode electrode 2 and cathode electrode 3, and thus they were electrically connected. As casing 6, a cylindrical plastic container having a diameter of 92 mm was used. As oxygen permeation restricting layer 13, agar-agar having a diameter of 90 mm (for example, available from Pioneer Planning) was used, and disposed between anode electrode 2 and cathode electrode 3 in the vertical direction of the casing. As soil or mud 5, commercially available leaf mold was used. In this manner, the microbial fuel cell of the first aspect of the invention having the configuration shown in FIG. 1 was produced.

COMPARATIVE EXAMPLE 1

A microbial fuel cell of Comparative example 1 was produced in the same manner as in Example 1 except that no oxygen permeation restricting layer was used.

Figure 10:
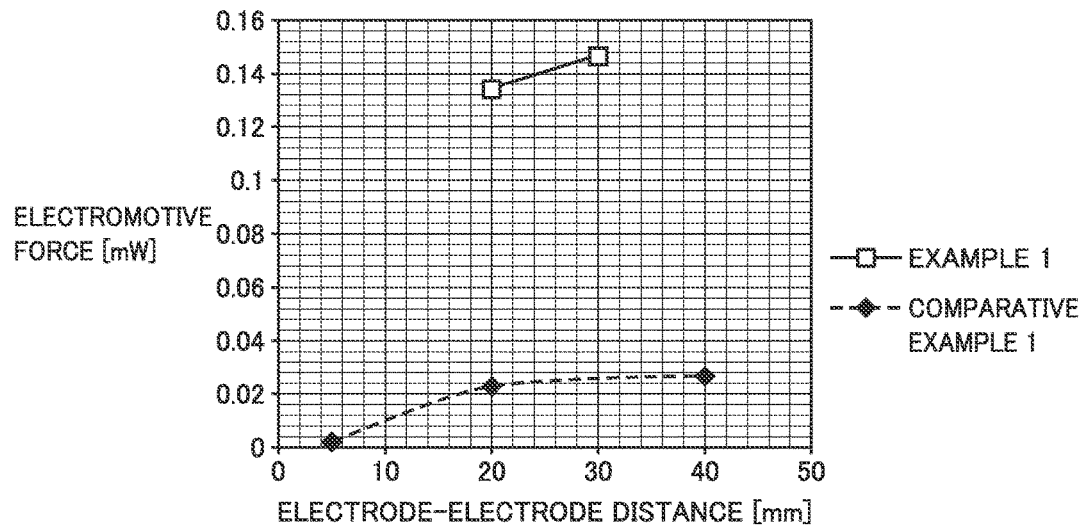
FIG. 10 is a graph showing the variation in the output power with the electrode-electrode distance in the microbial fuel cells of Example 1 and Comparative example 1.
Figure 11:
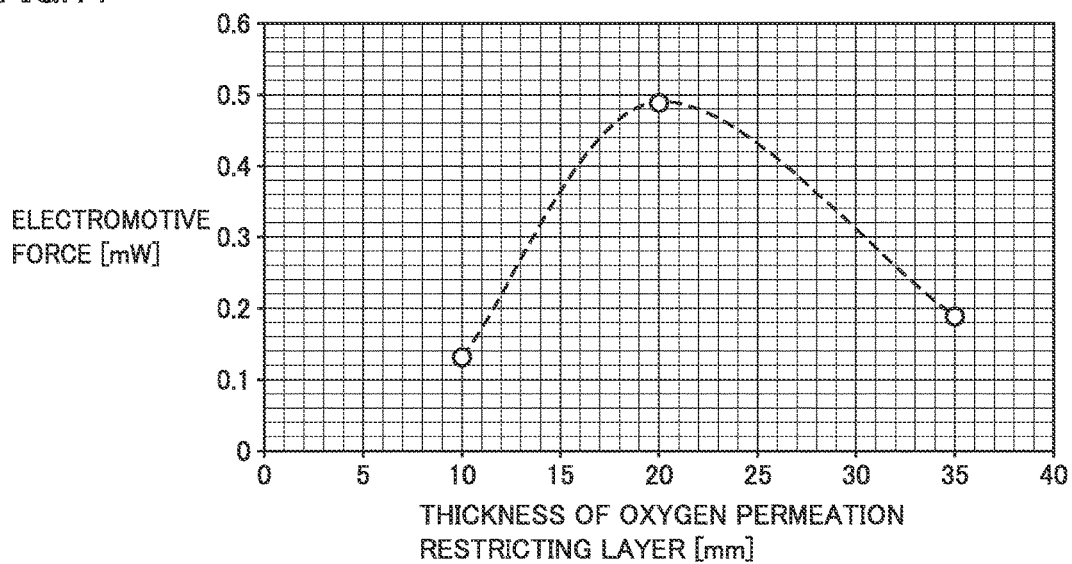
FIG. 11 is a graph in which the output power when the thickness of the oxygen permeation restricting layer is varied in the microbial fuel cell of Example 1 is plotted.

Using the microbial fuel cells produced in Example 1 and Comparative example 1, a variable resistance was inserted between terminals of anode electrode 2 and cathode electrode 3 at room temperature (25° C.), and the output power was compared. FIG. 10 is a graph showing the variation in the output power with the electrode-electrode distance in the microbial fuel cell provided with an oxygen permeation preventing layer (Example 1), and the microbial fuel cell not provided with an oxygen permeation restricting layer (Comparative example 1), and the vertical axis indicates electromotive force (mW), and the horizontal axis indicates electrode-electrode distance (mm) As shown in FIG. 10, for each microbial fuel cell of Example 1 and Comparative example 1, the electrode-electrode distance was varied by adjusting the thickness of soil or mud (5b, 5c). In microbial fuel cell 1 including 10-mm thick oxygen permeation restricting layer 4, higher performance was obtained for the same electrode-electrode distance. FIG. 11 is a graph in which the output power when the thickness of oxygen permeation restricting layer 4 in the microbial fuel cell of Example 1 is varied is plotted, and the vertical axis indicates electromotive force (mW), and the horizontal axis indicates thickness (mm) of the oxygen permeation restricting layer. These results reveal that a microbial fuel cell having improved performance and capable of being thinned can be realized by using an oxygen permeation restricting layer.

While embodiments of the present invention have been described above, embodiments disclosed herein are illustrative but not limitative in every point. The scope of the present invention is shown in claims, and every modification within the meaning and scope equivalent to those of claims is included in the present invention.

REFERENCE SIGNS LIST 1 microbial fuel cell, 2 anode electrode, 3, 3' cathode electrode, 4, 4' oxygen permeation restricting layer, 5, 5a, 5b, 5c, 5d soil or mud, 6 casing, 7 anaerobic current-generating bacteria, 8, 9 lead wire, 11 microbial fuel cell, 12 anode electrode, 13 oxygen permeation restricting layer, 21 microbial fuel cell, 22 cathode electrode, 23 oxygen permeation restricting layer, 31 microbial fuel cell, 32 anode electrode, 33 oxygen permeation restricting layer, 34 cathode electrode, 41 microbial fuel cell, 42 moisturizing layer, 51 microbial fuel cell, 52 casing, 53 hole, 61 microbial fuel cell, 62 anode electrode, 63 cathode electrode, 64 oxygen permeation restricting layer, 71 microbial fuel cell, 72 oxygen consuming layer, 81 microbial fuel cell, 101 casing, 104 ion conductive membrane, 111, 112, 113, 114, 115, 116, 117 microbial fuel cell, 120 negative electrode part, 121 negative electrode, 122 negative electrode-side soil layer, 123 negative electrode wiring, 130 positive electrode part, 131 positive electrode, 132 positive electrode-side soil layer, 133 negative electrode wiring, 161 plant, 162 greening base layer, 171 soil layer, 181 control circuit, 182 water storage tank, 183 electromagnetic valve, 184 water-pouring pipe, 201 microbial fuel cell, 202 first cylindrical retainer, 203 negative electrode, 204 ion conductor, 205 positive electrode, 206 first opening, 207 first opening, 208 negative electrode wiring, 209 positive electrode wiring, 211 soil layer, 212 high oxygen layer, 221 microbial fuel cell, 222 functional layer, 231 microbial fuel cell, 232 first cylindrical retainer, 233 first opening, 234 first opening, 235 negative electrode, 241 microbial fuel cell, 242 first cylindrical retainer, 243 tip end part, 244 first opening, 245 negative electrode, 251 microbial fuel cell, 252 first cylindrical retainer (outer cylinder), 253 second cylindrical retainer (inner cylinder), 254 first opening, 255 second opening, 256 negative electrode, 257 positive electrode, 258 ion conductor, 259 second opening, 260 tip end part, 261 negative electrode wiring, 262 positive electrode wiring, 271 microbial fuel cell, 272 first cylindrical retainer (outer cylinder), 273 second cylindrical retainer (inner cylinder), 274 tip end part, 275 negative electrode, 276 positive electrode, 277 ion conductor, 281 microbial fuel cell, 282 first cylindrical retainer (outer cylinder), 283 negative electrode, 284 second cylindrical retainer (inner cylinder), 285 positive electrode, 286 ion conductor, 291 microbial fuel cell, 292 first cylindrical retainer, 293 first opening, 294 ion conductor, 301 microbial fuel cell, 302 positive electrode, 311 microbial fuel cell, 312 first cylindrical retainer, 313 first opening, 314 second opening, 315 ion conductor, 316 negative electrode, 317 positive electrode.

The invention claimed is:
1. A microbial fuel cell comprising:
   an anode electrode that includes, as a catalyst, current-generating bacteria supplied from soil or mud, and oxidizes an organic fuel supplied from soil or mud; and
   a cathode electrode that reduces oxygen supplied from air or water, wherein
   the anode electrode and the cathode electrode face each other,
   the microbial fuel cell includes an oxygen permeation restricting layer located between the anode electrode and the cathode electrode, the oxygen permeation restricting layer is a layer formed of a hydrogel, and
the hydrogel is formed of a polymer sugar chain.

2. The microbial fuel cell according to claim 1, wherein a moisturizing layer is provided on said cathode electrode.

3. The microbial fuel cell according to claim 1, further comprising, on an anode electrode side of said oxygen permeation restricting layer, a casing having at least one hole through which at least either of a microorganism and a nutrient therefor is replaceable.

* * * * *